United States Patent
Millar et al.

(10) Patent No.: US 9,559,786 B2
(45) Date of Patent: Jan. 31, 2017

(54) PILOT-AIDED COHERENT RECEIVER FOR OPTICAL COMMUNICATIONS

(71) Applicant: Mitsubishi Electric Research Laboratories, Inc., Cambridge, MA (US)

(72) Inventors: David S Millar, Winchester, MA (US); Toshiaki Koike-Akino, Malden, MA (US); Milutin Pajovic, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 22 days.

(21) Appl. No.: 14/743,119

(22) Filed: Jun. 18, 2015

(65) Prior Publication Data

US 2016/0277121 A1 Sep. 22, 2016

Related U.S. Application Data

(60) Provisional application No. 62/134,117, filed on Mar. 17, 2015.

(51) Int. Cl.
*H04B 17/00* (2015.01)
*H04B 10/69* (2013.01)
(Continued)

(52) U.S. Cl.
CPC ...... *H04B 10/6971* (2013.01); *H04B 10/0795* (2013.01); *H04B 10/6972* (2013.01); *H04L 1/0036* (2013.01)

(58) Field of Classification Search
CPC ...... H04B 2210/075; H04B 1/76; H04J 14/00; H04J 14/005; H04J 2027/0038; H04J 27/2675
(Continued)

(56) References Cited

U.S. PATENT DOCUMENTS 8,204,156 B2 6/2012 Hewavithana et al.
8,311,417 B1 11/2012 Poffiolini et al.
(Continued)

OTHER PUBLICATIONS

Zibar et al. "Application of Machine Learning Techniques for Amplitude and Phase Noise Characterization." Journal of Lightwage Technology, vol. 33, No. 7, Apr. 1, 2015. p. 1333-1343.
(Continued)

*Primary Examiner* — Don N Vo
(74) *Attorney, Agent, or Firm* — Gene Vinokur; James McAleenan; Hironori Tsukamoto

(57) ABSTRACT

A method decodes an optical signal transmitted over an optical channel from a transmitter to a receiver. The receiver receives the transmitted optical signal to produce a digital signal including data symbols and pilot symbols, and determines filtering coefficients based on an error between amplitudes of the received pilot symbols and amplitudes of transmitted pilot symbols, while ignoring errors between phases of the received pilot symbols and phases of the transmitted pilot symbols. The amplitudes and the phases of the transmitted pilot symbols are known at the transmitter and the receiver. The receiver filters the digital signal according to the filtering coefficients to produce a filtered signal with equalized amplitude and an unconstrained phase demodulates and decodes the filtered signal to produce an estimate of the transmitted optical signal.

20 Claims, 16 Drawing Sheets

(51) Int. Cl.
*H04L 1/00* (2006.01)
*H04B 10/079* (2013.01)

(58) Field of Classification Search
USPC .................................. 398/25; 375/232, 350
See application file for complete search history.

(56) References Cited

U.S. PATENT DOCUMENTS

| | | | | |
|---|---|---|---|---|
| 2005/0238109 | A1* | 10/2005 | Koga | H04L 27/0004 375/260 |
| 2008/0063040 | A1* | 3/2008 | Akahori | H04L 25/0224 375/232 |
| 2009/0147839 | A1 | 6/2009 | Grenabo | |
| 2011/0217043 | A1 | 9/2011 | Pfau | |
| 2013/0030931 | A1* | 1/2013 | Moshfeghi | G01S 19/48 705/16 |
| 2013/0089341 | A1 | 4/2013 | Roberts et al. | |
| 2013/0329834 | A1 | 12/2013 | Zhou | |
| 2014/0010532 | A1 | 1/2014 | Zhang et al. | |
| 2014/0064102 | A1* | 3/2014 | Pelekhaty | H04B 10/6162 370/241 |
| 2015/0372766 | A1* | 12/2015 | Yoshida | H04B 10/2507 398/193 |

OTHER PUBLICATIONS

Pfau et al. "Hardware Efficient Coherent Digital Receiver Concept with Feedforward Carrier Recovery for M-QAM Constellations." Journal of Lightweight Technology. vol. 27, No. 8. Apr. 15, 2009. p. 989-999.

Bilal et al. "Multistage Carrier Phase Estimation Algorithms for Phase Noise Mitigation in 64-Quadrature Amplitude Modulation Optical Systems," Journal of Lightweight Technology. vol. 32, No. 17. Sep. 1, 2014. p. 2937-2980.

Zhou et al. "Low-Complexity Carrier Phase Recovery for Square M-QAM Based on S-BPS Algorithm." IEEE Photonics Technology Letters, vol. 26, No. 18, Sep. 15, 2014. p. 1863-1866.

Zhou et al. "High Spectral Efficiency 400 Gb/s Transmission Using PDM Time-Domain Hybrid 32-64 QAM and Training-Assisted Carrier Recovery," Journal of Lightweight Technology. vol. 31, No. 7. Apr. 1, 2013. p. 999-1005.

* cited by examiner

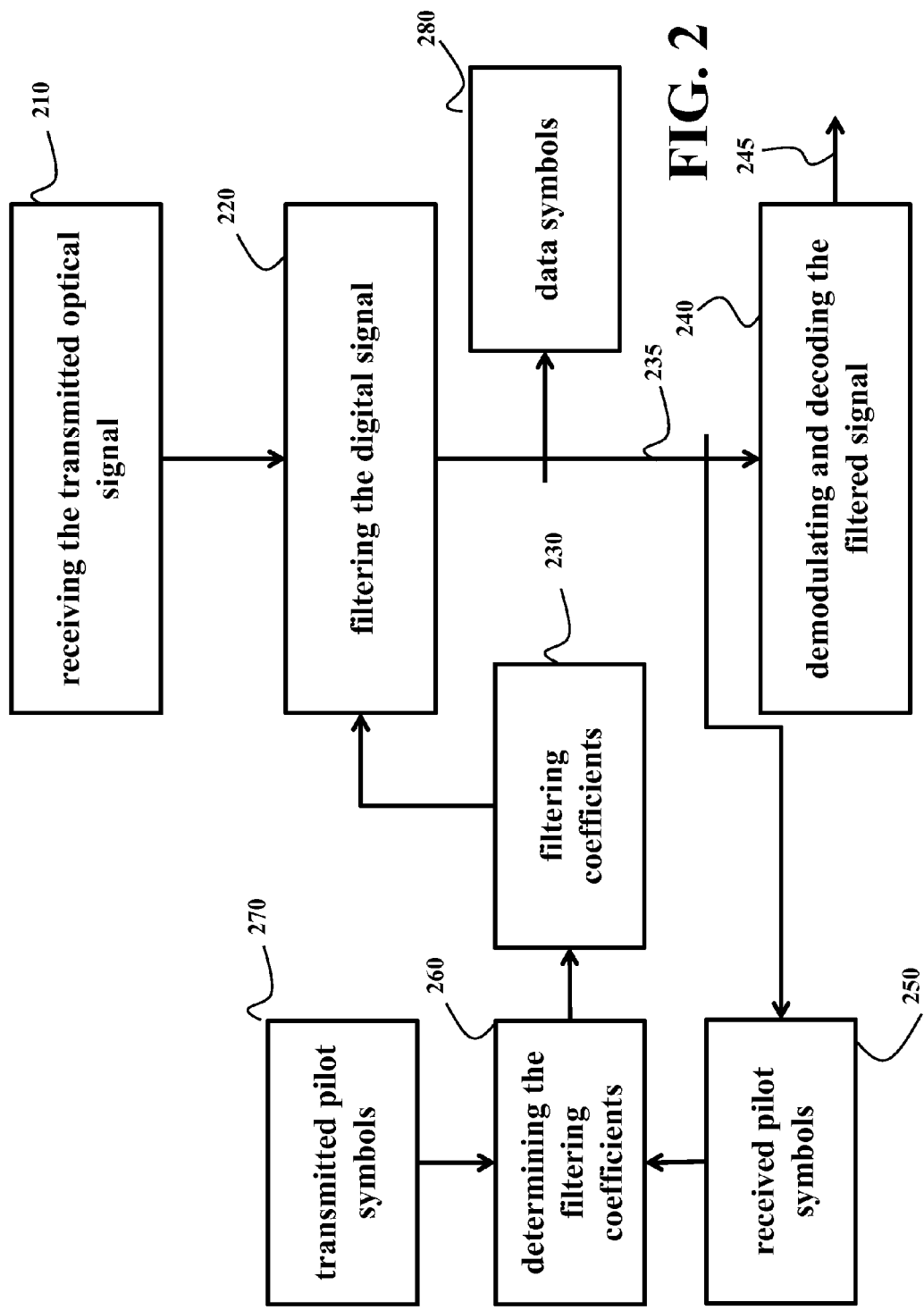

PILOT-AIDED COHERENT RECEIVER FOR OPTICAL COMMUNICATIONS

RELATED APPLICATIONS

This application claims priority under 35 U.S.C. §119(e) from U.S. provisional application Ser. No. 62/134,117 filed on Mar. 17, 2015, which is incorporated herein by reference.

FIELD OF THE INVENTION

This invention relates generally to coherent optical communications systems, and more particularly to decoding data transmitted over an optical channel.

BACKGROUND OF THE INVENTION

Inaccuracies in carrier-phase estimation and amplitude equalization cause distortions, i.e., the noise enhancements, which reduce the performance of optical communications systems. In the optical communications, different algorithms are used to reduce the distortion. Those algorithms are based on a hard decision for determining the phase and amplitude of the received signal. For example, a decision-directed least-mean-square (LMS) method uses the hard decision for determining the error for the updating.

However, the hard decisions can be incorrect causing suboptimal phase and amplitude equalization. The problem of inaccuracy of the hard decisions is especially apparent in the applications with low signal-to-noise ratios (SNR). However, for each fixed SNR, there is a need to further improve the data throughput and other performance metrics of optical communications, such as spectral efficiency of the transmitted signal.

In order to provide higher optical interface rates, recent research has focused on the expansion of both bandwidth and spectral efficiency. While some researches have focused on the slicing of the received signals in the time or frequency domains, these solutions require several parallel coherent receivers. Current results using a single coherent receiver have exceeded 640 Gb/s net bit rate. However, there is a demand to provide a system and a method for detection of a net bit rate in excess of 1 Tb/s with a single coherent receiver.

Detection of the bit rates in excess of 1 Tb/s with a single receiver requires accurate demodulation of the signals. To demodulate signals in an optical communications system, it is necessary to equalize distortions to both phase and amplitude of the received signals, caused by the optical and electrical components. This is particularly difficult for densely modulated signals with high-order quadrature-amplitude modulation (QAM), such as 64-QAM and 256-QAM.

Some conventional systems, such as a system described in U.S. Pat. No. 8,320,778, perform amplitude equalization using a radius-directed constant-modulus algorithm (CMA) equalizer, with an updating algorithm, such as an LMS method. That method yields acceptable results with high SNR and reasonably low density modulation, e.g., 8QAM, 16QAM. However, densely modulated signals that can result in bit rates in excess of 1 Tb/s can cause significant tap noise at the equalizer output, due to the inaccuracy of the blind decisions based on the radius of the received signals.

For equalization of phase distortions, conventional systems can use a blind phase search approach, see, e.g., U.S. 2011/0217043. However, that approach has a high complexity for densely modulated signals and suffers from poor performance in a low SNR regime.

SUMMARY OF THE INVENTION

Some embodiments of the invention are based on realization that pilot-aided equalization can be advantageously used for optical signals, especially for the equalization of the densely modulated optical signals, such as dual-polarization (DP) 64QAM and DP-256QAM. This is because the decrease of the bit rate due to the pilot symbols can be compensated by the increase of the modulation order of the optical signals due to more accurate equalization of the optical signals.

Some embodiments of an invention are based on recognition that in optical communications the distortion of the amplitude of the signals is slower than the distortion of the phase. Therefore, it is possible to separate equalization of the amplitude and equalization of the phase of the signals transmitted over an optical channel. To that end, some embodiments perform pilot-aided amplitude equalization, while ignoring the phase component of the pilot signals. Additionally or alternatively, some embodiments perform pilot-aided phase equalization separately from the amplitude equalization.

Separate amplitude and phase pilot-aided equalization used by some embodiments of the invention is in contrast with the pilot-aided equalization attempting to correct both amplitude and phase at the same time. While joint equalization is sufficient for wireless systems, the high levels of phase noise, and the need for parallel processing in optical systems, necessitates the separation of amplitude equalization and the estimation of carrier phase.

In addition, the separate equalization allows using multiple pilot symbols, e.g., by averaging the error over several pilots, therefore diminishing the influence of noise on the received pilot amplitude. Accordingly, some embodiments use pilot symbols to equalize amplitude of the optical signal separately from the phase equalization, e.g., perform amplitude equalization based on a difference of radiuses of transmitted and received pilot symbols.

Some embodiments of the invention are based on another realization that the phases of the optical signals are rapidly changing and are subject to phase noise and additive noise, so just comparisons of the phases of pilot symbols do not provide accurate results. Due to the physical nature of the optical channel, the phases of the received pilot symbols depend on phases of other received symbols including other pilot symbols. Therefore, by collectively considering the multitude of phases of the received pilot symbols, that dependency can be used to estimate the phase of the data symbols. Accordingly, some embodiments use pilot symbols to determine the probability distribution of phases for the entire signals. Soft decisions and expectation maximization (EM) can then be used to refine that probability distribution.

Accordingly, one embodiment discloses a method for decoding an optical signal transmitted over an optical channel from a transmitter to a receiver. The method includes receiving the transmitted optical signal to produce a digital signal including data symbols and pilot symbols; determining filtering coefficients based on an error between amplitudes of the received pilot symbols and amplitudes of transmitted pilot symbols, while ignoring errors between phases of the received pilot symbols and phases of the transmitted pilot symbols, wherein the amplitudes and the phases of the transmitted pilot symbols are known at the transmitter and the receiver; filtering the digital signal according to the filtering coefficients to produce a filtered signal with an equalized amplitude and an unconstrained phase; and demodulating and decoding the filtered signal to produce an estimate of the transmitted optical signal. At least some steps of the method are performed using a processor of the receiver.

Another embodiment discloses a receiver for decoding an optical signal transmitted by a transmitter over an optical channel including a front end for receiving the transmitted optical signal to produce a digital signal including data symbols and pilot symbols; an amplitude equalizer for determining filtering coefficients based on an error between amplitudes of the received pilot symbols and amplitudes of transmitted pilot symbols, while ignoring errors between phases of the received pilot symbols and phases of the transmitted pilot symbols and for filtering the digital signal according to the filtering coefficients to produce a filtered signal with an equalized amplitude and an unconstrained phase; a phase equalizer for determining a probability distribution of phase noise on the data symbols using a statistical probability distribution of phase noise on the optical channel and a probability distribution of phase noise on the pilot symbols; and a decoder for demodulating and decoding the filtered signal using the probability distribution of phase noise on the data symbols to produce an estimate of the transmitted optical signal.

BRIEF DESCRIPTION OF THE DRAWINGS

FIG. 2 is a flow diagram of a method for decoding an optical signal according to some embodiments of the invention;

DETAILED DESCRIPTION OF THE PREFERRED EMBODIMENTS

Figure 1A:
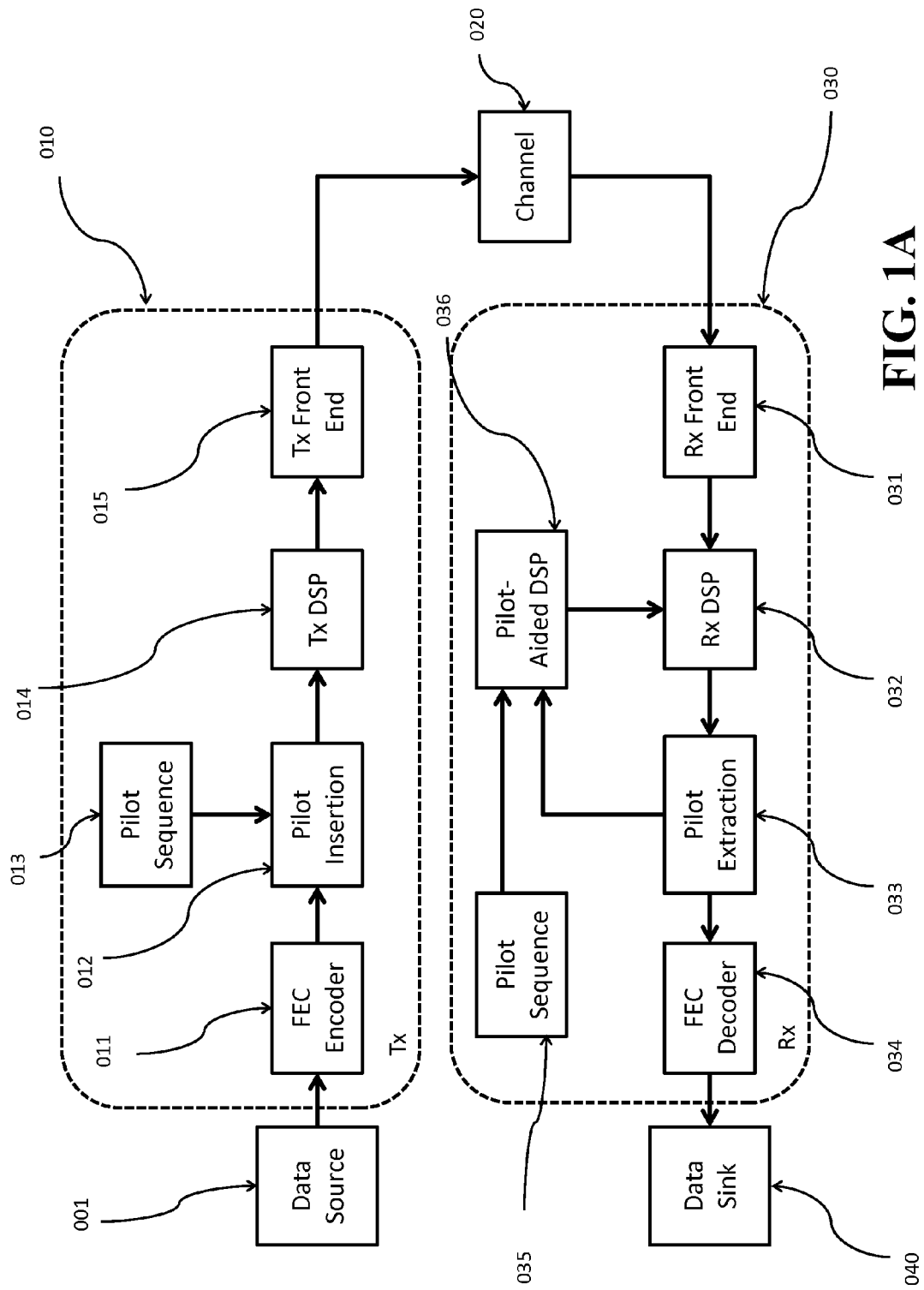
FIG. 1A is a block diagram of a pilot-aided optical communications system according to some embodiments of the invention.

FIG. 1A shows a block diagram of a pilot-aided optical communications system according to some embodiments of the invention. Data from a source (001) are sent to a transmitter (Tx) (010). For example, the data are sent to an optional forward error correction (FEC) encoder (011) and then the data are sent to a pilot insertion block (012), where pilot symbols from a pilot sequence (013) are added at some pre-determined rate to produce a signal including a set of data symbols and a set of pilot symbols with known amplitudes and phases. After insertion of the pilot symbols, the signal undergoes digital signal processing (DSP) (014). In some embodiments, the DSP also performs other functions such as mapping, filtering and pre-equalization. The signal is then sent to the transmitter front end (015), where analog operations such as amplification, filtering, modulation and up-conversion occur, and then transmitted over an optical channel (020) to a receiver (Rx) (030).

At the receiver, the signal passes through the receiver front end (031) for performing analog operations such as down-conversion, amplification, filtering and quantization of the received signal to produce a digital signal. The digital signal is processed by digital algorithms (032), before extraction of the received pilot symbols (033). The extracted pilot symbols are then processed in combination with the transmitted pilot sequence (035) with known amplitudes and phases corresponding to the pilot symbols (013), by the pilot-aided DSP algorithms (036). Information resulting from this processing is then used in the receiver DSP (032) in order to improve accuracy of the equalization and carrier phase recovery. The received signal after pilot extraction is then optionally sent for FEC decoding (034), before being sent to a destination, e.g., a data sink (040).

Figure 1B:
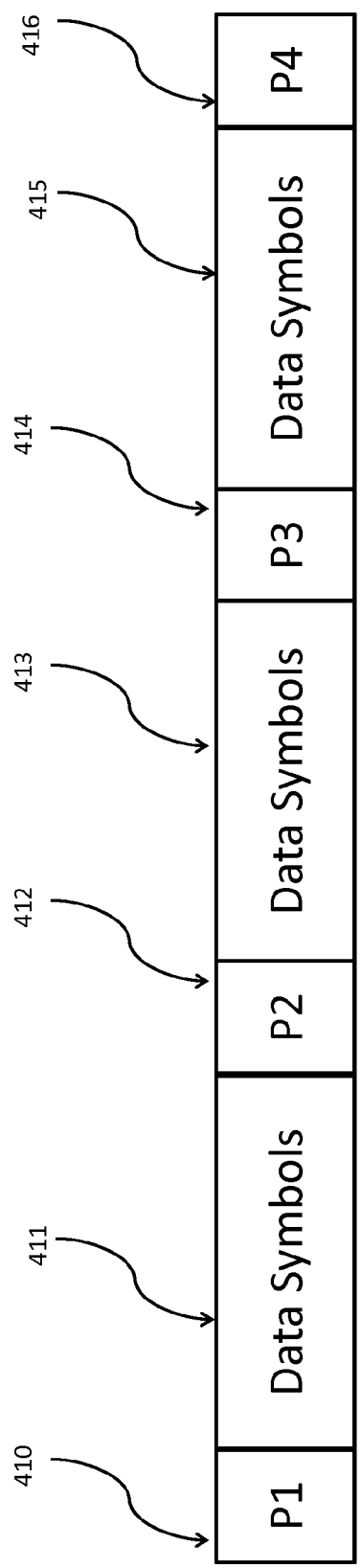
FIG. 1B is an exemplar structure of a signal including a set of data symbols and a set of pilot symbols with known amplitudes and phases according to some embodiments of the invention.

FIG. 1B shows an exemplar structure of the corresponding digital signal to be encoded. The signal includes a set of data symbols and a set of pilot symbols with known amplitudes and phases according to some embodiments of the invention. Several pilot symbols (410, 412, 414, and 416) are distributed through several blocks of data symbols (411, 413, and 415). Digital signal processing on a single block of data symbols (413) can be performed using adjacent pilot symbols (412, 414) and/or non-adjacent pilot symbols (410, 416).

Figure 1C:
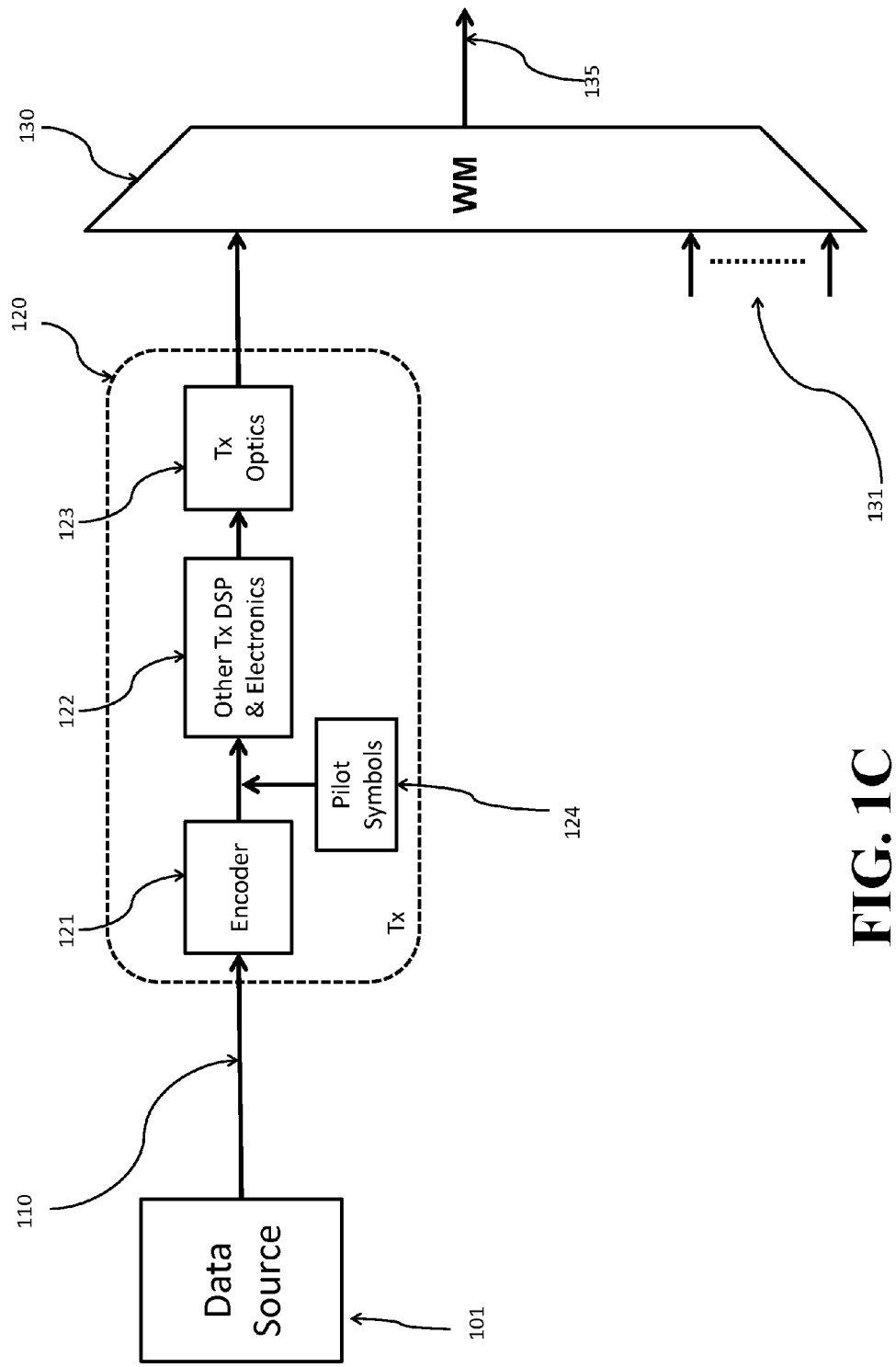
FIG. 1C is a block diagram of a transmitter for a pilot-aided optical communications system according to one embodiment of the invention.

FIG. 1C shows a block diagram of a transmitter for a pilot-aided optical communications system according to one embodiment of the invention. Data (110) from a source (101) are sent to a transmitter (120). In the transmitter, the data are encoded by an FEC encoder (121), before pilot symbols (124) are inserted intermittently. The signal then undergoes processing with DSP algorithms and other front end electronics (122) such as analog-to-digital convertors.

The signal is then sent to the transmitter optics (123) for modulation on to the optical carrier. The optical signal is then sent to a wavelength multiplexer (WM) (130), where the signal can be optionally combined with other optical signals which have different wavelengths (131), before being sent to the optical channel (135).

Figure 1D:
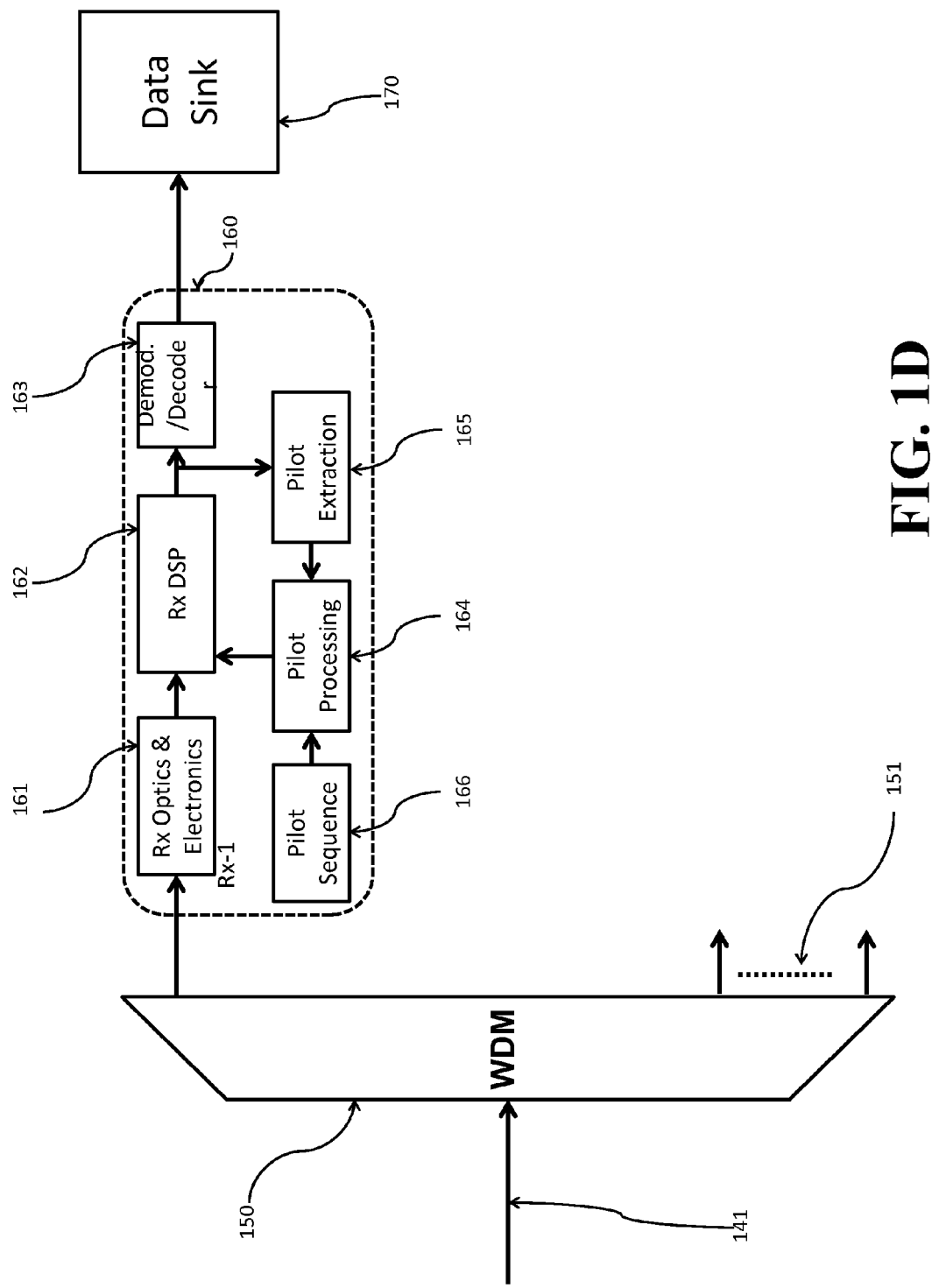
FIG. 1D is a block diagram of a receiver for the pilot-aided optical communications system according to one embodiment of the invention.

FIG. 1D shows a block diagram of a receiver in the pilot-aided optical communications system according to one embodiment of the invention. The signal from the optical channel (141) is sent to a wavelength de-multiplexer (WDM) (150). Other wavelengths (151) are optionally sent to other receivers for processing independently of the wavelength channel of interest. The signal is then sent to the receiver (160). The optical signal is detected by the optical receiver front end (161). This block can include both optical and electronic elements, such as down-conversion, amplification, and quantization. The digital signal is then processed by DSP algorithms (162). After DSP processing, the received pilot symbols are extracted (165), and processed (164) in combination with the known transmitted sequence (166) of pilot symbols. Information from this pilot processing is then used in the Rx DSP (162) that includes an equalizer for functions such as amplitude and phase equalization. The processed signal is then sent for demodulation module (163) to produce soft-decision information for FEC decoding, before being sent to its final destination, e.g., the data sink (170).

Amplitude Equalization

Some embodiments of the invention are based on a general realization that for optical communications the rate of phase variations of the optical signal is different than the rate of variations of the amplitude of the optical signal. Therefore, it is advantageous to equalize the phase and the amplitudes of the optical signal separately.

FIG. 2 shows a flow diagram of a method for decoding an optical signal transmitted over an optical channel from a transmitter to a receiver according to some embodiments of the invention. In these embodiments, the amplitude of the transmitted optical signal is equalized separately from the phase of the transmitted optical signal. At least some steps of the method are performed using a processor and other components of the receiver.

The method filters 220 the received optical signal 210, with filter coefficients 230, to produce a digital signal including data symbols 280 and pilot symbols 250. This process produces a filtered signal 235 with an equalized amplitude and an unconstrained phase, and demodulates and decodes 240 the filtered signal to produce an estimate 245 of the transmitted optical signal. The method then determines 260 a new set of filtering coefficients 230 based on an error between amplitudes of the received pilot symbols 250 and amplitudes of transmitted pilot symbols 270, while ignoring errors between phases of the received pilot symbols and phases of the transmitted pilot symbols.

Figure 3:
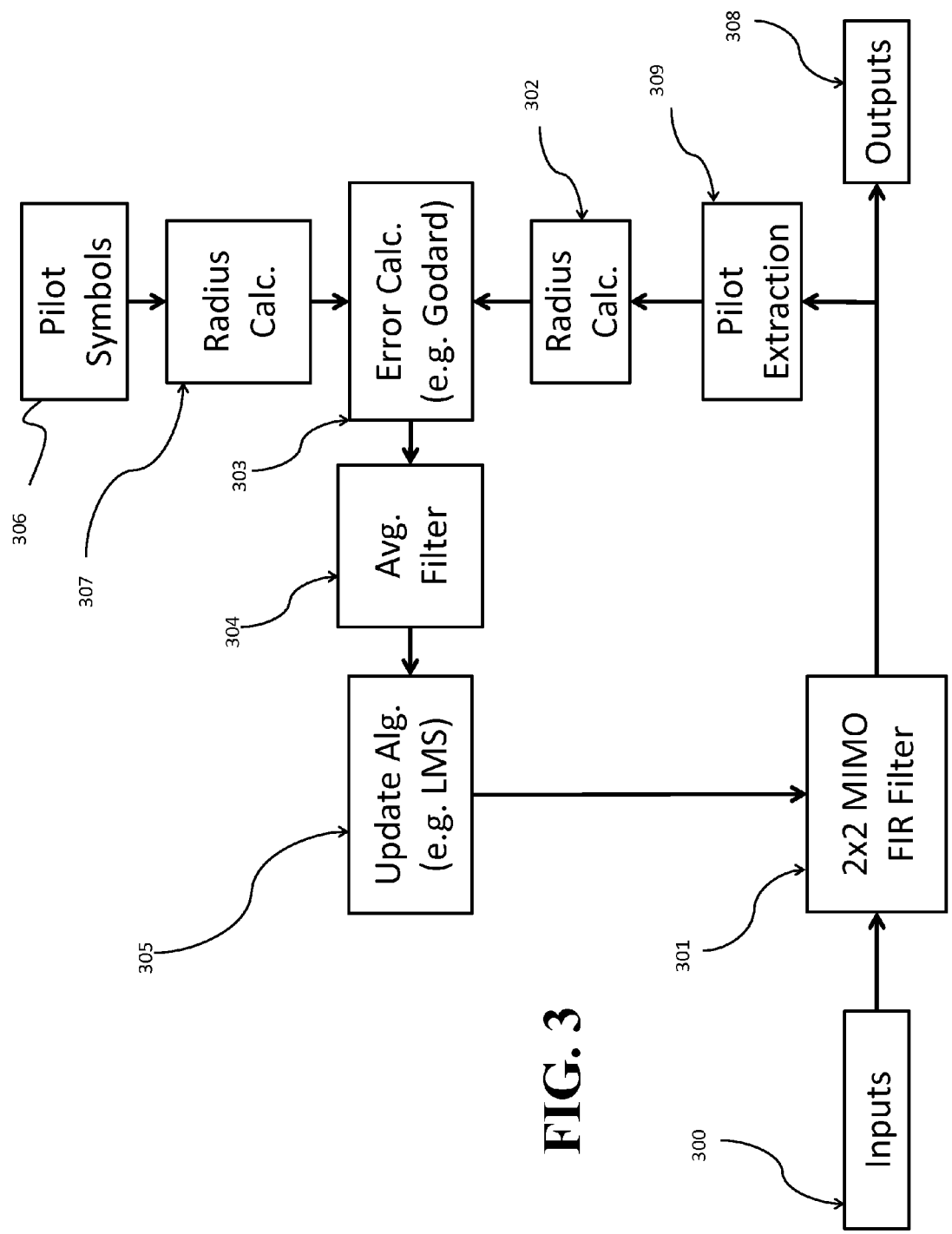
FIG. 3 is a schematic of an amplitude equalizer according to some embodiments of the invention.

FIG. 3 shows a schematic of a dual polarization amplitude equalizer suitable for a high phase noise application such as optical communications, where polarization multiplexing is used according to some embodiments of the invention. The equalizer updates the filtering coefficients iteratively, e.g., receiving each pilot symbol and/or in response to determining an error in filtering the signal.

In different embodiments of the invention, the amplitudes of the pilot and/or data symbols include the amplitudes on both of the two orthogonal polarizations used for data transmission, and the amplitudes are defined by the radiuses on each polarization. Both the amplitudes and the phases of the transmitted pilot symbols are known at the transmitter and the receiver.

In the amplitude equalizer, an input signal (300) is sent to a finite impulse response (FIR) filter (301) for equalization of amplitude distortion, forming an output (308), i.e., a filtered signal with equalized amplitude and unconstrained phase. The coefficients of the filter are updated as follows. Received pilot symbols are extracted (309), e.g., from the equalized signal, and their radius calculated (302). Concurrently, the known pilot symbols (306) also go through a radius calculation procedure (307). In some embodiments, this calculation can be performed in advance, and stored in memory.

An equalizer error is then calculated (303) based on the radius of the received pilot symbol and the radius of the transmitted pilot symbol, for example, using the Godard algorithm. According to some embodiments, the error term then optionally undergoes filtering in order to improve its accuracy. The error term is then used as an input to an updating algorithm such as the LMS algorithm or recursive least-squares (RLS) algorithm to calculate new filter coefficients (305).

For example, the outputs 308 of the 2-by-2 MIMO filter 301 are given by:

$$v_x = h_{xx} u_x^H + h_{yx} u_y^H, \text{ and}$$

$$v_y = h_{xy} u_x^H + h_{yy} u_y^H,$$

where $u_x$ and $u_y$ are the input vectors 300 on the x and y polarizations respectively, $h_{xx}$, $h_{yx}$, $h_{xy}$, and $h_{yy}$ are the coefficients of the four FIR filters, $v_x$ and $v_y$ are the instantaneous outputs 308 on the x and y polarizations respectively, and the superscript of $^H$ operator is the Hermite transpose.

Some embodiments calculate error terms 303 according to the radiuses 307, 302 of the transmitted 306 and received 309 pilots on each polarization, for example, according to the CMA:

$$e_x = |p_x|^2 - |v_x|^2$$

$$e_y = |p_y|^2 - |v_y|^2,$$

where $e_x$ and $e_y$ are the error terms on the x and y polarizations respectively, and $p_x$ and $p_y$ are the pilot symbols on the x and y polarizations respectively.

The error can be further refined by using a filtered version of the error term, given in the case of a sliding window accumulator filter as:

$$e_{x'} = \sum_{n=1}^{M} e_x(n)/M$$

$$e_{y'} = \sum_{n=1}^{M} e_y(n)/M$$

where $e_{x'}$ and $e_{y'}$ are the averaged error terms on the x and y polarizations respectively, and M is the number of error terms, which are averaged.

The coefficients of the filter 301 are determined using the error term and some adaptation algorithm, for example, the LMS algorithm, which is determined by the following set of equations:

$$h_{xx}' = h_{xx} + \mu e_x u_x v_x^*$$

$$h_{yx}' = h_{yx} + \mu e_x u_y v_x^*$$

$$h_{xy}' = h_{xy} + \mu e_x u_x v_y^*$$

$$h_{yy}' = h_{yy} + \mu e_y u_y v_y^*,$$

where the vectors $h_{xx}'$, $h_{yx}'$, $h_{xy}'$ and $h_{yy}'$ are the updated filter coefficient vectors, the superscript of * is the conjugate operator, $\mu$ is the equalizer convergence parameter.

The filter coefficients are updated iteratively. In different embodiments, because of disjoint amplitude and phase equalization, the rate of iteration to equalize the amplitude is slower than a rate of change of phases in the optical signal and slower that that the rate of iteration for equalizing the phase of the signal, as described below. For example, for one iteration updating 305 the filter coefficients the receiver performs several iterations for updating the phase.

Some embodiments of the invention are based on a realization that FIR coefficients defining the amplitudes disturbance are vary over time. Also, there is a need to use multiple pilot signals to determine the FIR coefficients accurately. Therefore, some embodiments use the training mode with transmitting continuous sequence pilot signals to increase the accuracy of FIR filter 301 based on radiuses of the continuous sequence of the pilot signals. In those embodiments, the training using the continuous sequence of pilot signals result in faster and more accurate initialization of the FIR coefficients, which enables subsequent tracking of those FIR coefficients over time.

To that end, in some embodiments of the invention, the transmission of the optical signal includes a training mode and a decoding mode. During the training mode, the digital signal includes a continuous sequence of pilot symbols, the embodiments determine, during the training mode, the filtering coefficients based on the error between the amplitudes of the received and the transmitted pilot symbols in the continuous sequence and initialize the filtering coefficients determined during the training mode for use during the decoding mode.

For example, one embodiment determines an average error between the amplitudes of the received and the transmitted pilot symbols in the continuous sequence and determines the filtering coefficient using the average error. In different embodiments the average error is determined using a block and/or a sliding window update. During the block update, the average error is determined for the entire sequence or for each subset of the entire sequence of pilot symbols. During the sliding window the average error is determined for pilot symbols of the window sliding from the start to the end of the sequence. Resulting average errors are used to determine the filtering coefficients. Additionally or alternatively, one embodiment determines an error between amplitude of each received pilot symbol and a corresponding transmitted pilot symbols in the continuous sequence to produce a sequence of errors and updates the filtering coefficient iteratively for each error in the sequence of errors.

In different embodiments, the average error is determined using the low pass filter filtering out the noise in the error signal. This embodiment is based on the realization that the errors between the transmitted pilot symbols and the pilot symbols filtered by the filter with filtering coefficients are caused by different sources. Those sources include channel noise and the mismatch between correct filter coefficients and the coefficients currently used for the filtering operation. Because the objective of initializing the filtering coefficients does not consider compensating for the noise, the low pass filter is designed to cancel the noise effect in determining the average error. In some embodiments, the noise effect is reduced using the low pass filter.

Figure 4:
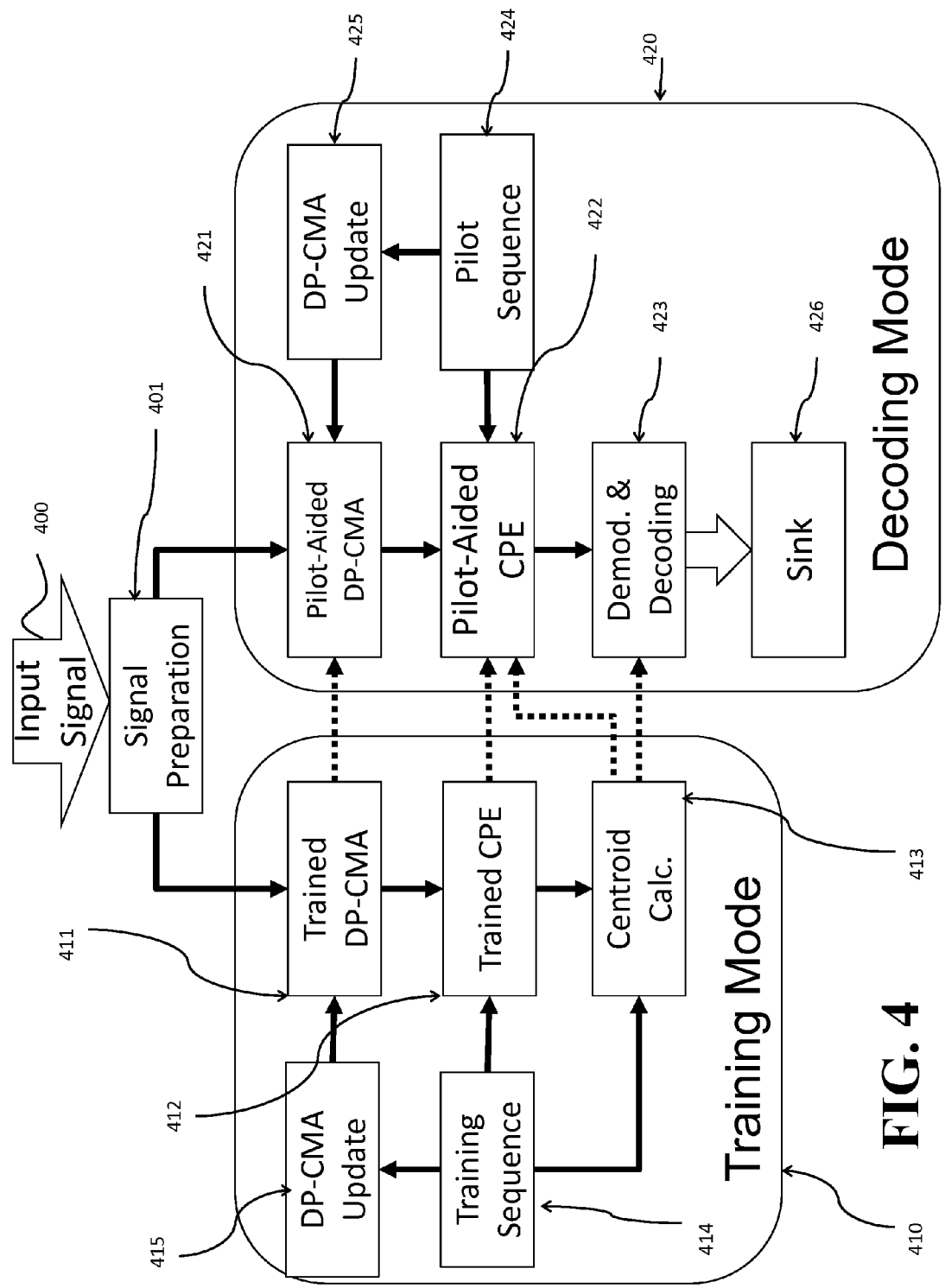
FIG. 4 is a schematic of the receiver for a pilot-aided optical communications system according to one embodiment of the invention.

FIG. 4 shows a schematic of the receiver for a pilot-aided optical communication system that uses the training and decoding modes according to one embodiment of the invention. An input signal (400) is prepared for processing (401), by performing static functions such as normalization, chromatic dispersion compensation, and intradyne-frequency offset compensation. The signal is optionally sent to a training mode (410), which aims to perform accurate initialization of the equalization, carrier phase estimation (CPE) and demodulation algorithms. In training mode, the signal is sent to a trained DP-CMA adaptive equalizer (411). A training sequence (414) of known symbols is used to calculate the CMA error terms, from which the tap update of the DP-CMA algorithm is calculated (415), using for example, the LMS method.

The output of the equalizer has randomly varying phase, which is tracked by a trained CPE algorithm (412), which also takes advantage of the known training sequence (414). The output of the trained CPE is used to calculate the centroid of each constellation point in the training sequence (413). When the equalizer has converged sufficiently well, and the centroid calculations are considered accurate, the receiver is switched to pilot-aided mode (420). In this case, the prepared signal is processed with a pilot-aided DP-CMA (421), whose taps are initialized optionally by those calculated by the trained DP-CMA (411). The pilot-aided DP-CMA equalizer is adapted periodically (425) according to the pilot sequence (424), although the update takes account of the radius of the pilot symbols only. After equalization, the signal undergoes pilot-aided CPE (422), with the initial estimate of phase being optionally provided by the training mode. Following CPE, the signal undergoes demodulation and decoding (423), with these operations optionally accounting for the centroid calculations provided by (413) during training mode. Finally, the recovered and decoded data are sent to its destination, e.g., the sink (426).

Some of these embodiments are based on the realization that accurate training of the amplitude equalizer (421) is required due to the sensitivity of densely modulated signals to noise. Furthermore, the speed of convergence for the equalizer can be improved if the sequence is entirely known to the receiver, i.e., that is, a training sequence (414), rather than a sequence of symbols, of which only a partial subset is known to the receiver, i.e., the pilot sequence (424). Other embodiments of the invention are based on the realization that some distortion on the signal is static and nonlinear (such as distortion due to imperfect modulator biasing), and it is possible to improve the accuracy of both carrier phase estimation (422), and demodulation (423) based on an analysis of the signal resulting from the training sequence (413). For example, the nonlinear distortion is trained by the LMS or RLS algorithms to analyze data-dependent statistics of the centroids, covariance, skewness, and correlation using the training sequence.

Phase Equalization

Some embodiments of the invention are based on a realization that due to the physical nature of the optical channel, the phases of the received pilot symbols depend on phases of other received symbols including other pilot symbols. Therefore, by collectively considering the multitude of phases of the received pilot symbols, the dependency can be used to estimate the phase of the data symbols.

Other embodiments of the invention are based on the realization that due to the nature of the optical channel, the transmitted and received pilot symbols can be used to calculate not only an initial phase estimate, but also a distribution of probabilities of time-varying phases.

Therefore, by exploiting not only the most likely initial phase estimate, but also the initial probability distribution of the phases, the performance of phase equalization can be improved. In addition, the estimated probability information can provide more reliable calculation of soft-decision information at the demodulator so that the FEC decoder can efficiently correct potential errors after equalizations.

Figure 5A:
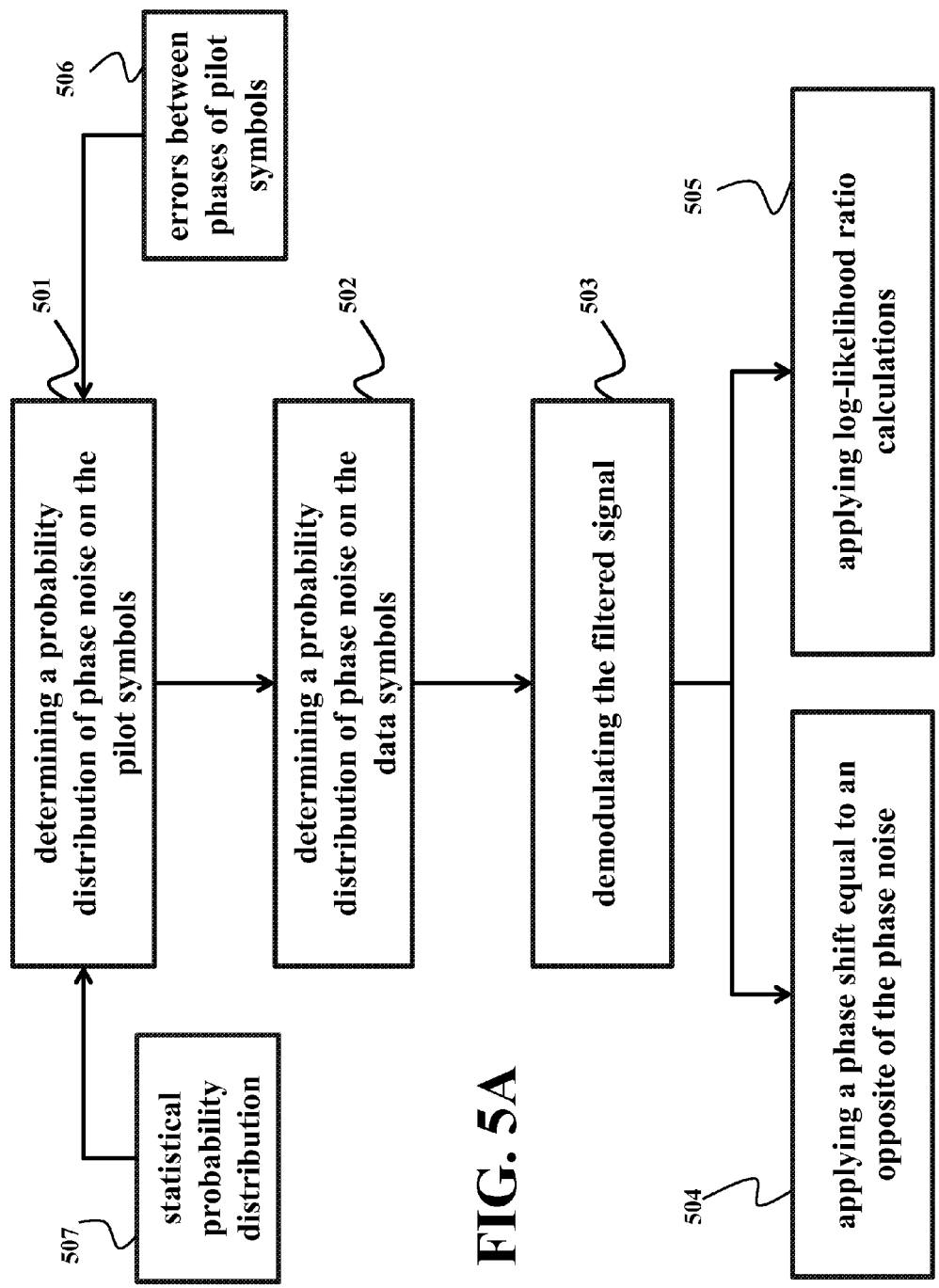
FIG. 5A is a flow diagram of a method for pilot-aided phase equalization of the transmitted optical signal according to some embodiments of the invention.

FIG. 5A shows a block diagram of a method for pilot-aided phase equalization of the transmitted optical signal according to some embodiments of the invention. The method determines 501 a probability distribution of phase noise on the pilot symbols using a statistical probability distribution 507 of phase noise on the optical channel and errors 506 between phases of the received and the transmitted pilot signals. Based on the determined probability distribution of phase noise on the pilot symbols, the method determines 502 a probability distribution of phase noise on the data symbols and demodulates 503 the filtered signal using the probability distribution of phase noise on the data symbols.

For example, one embodiment determines phase noise corresponding to the probability distribution of phase noise on the data symbols and applies 504 a phase shift equal to an opposite of the phase noise to the filtered signal. Additionally or alternatively, one embodiment applies 505 the probability distribution of phase noise on the data symbols to log-likelihood ratio (LLR) calculations for the demodulation.

Figure 5B:
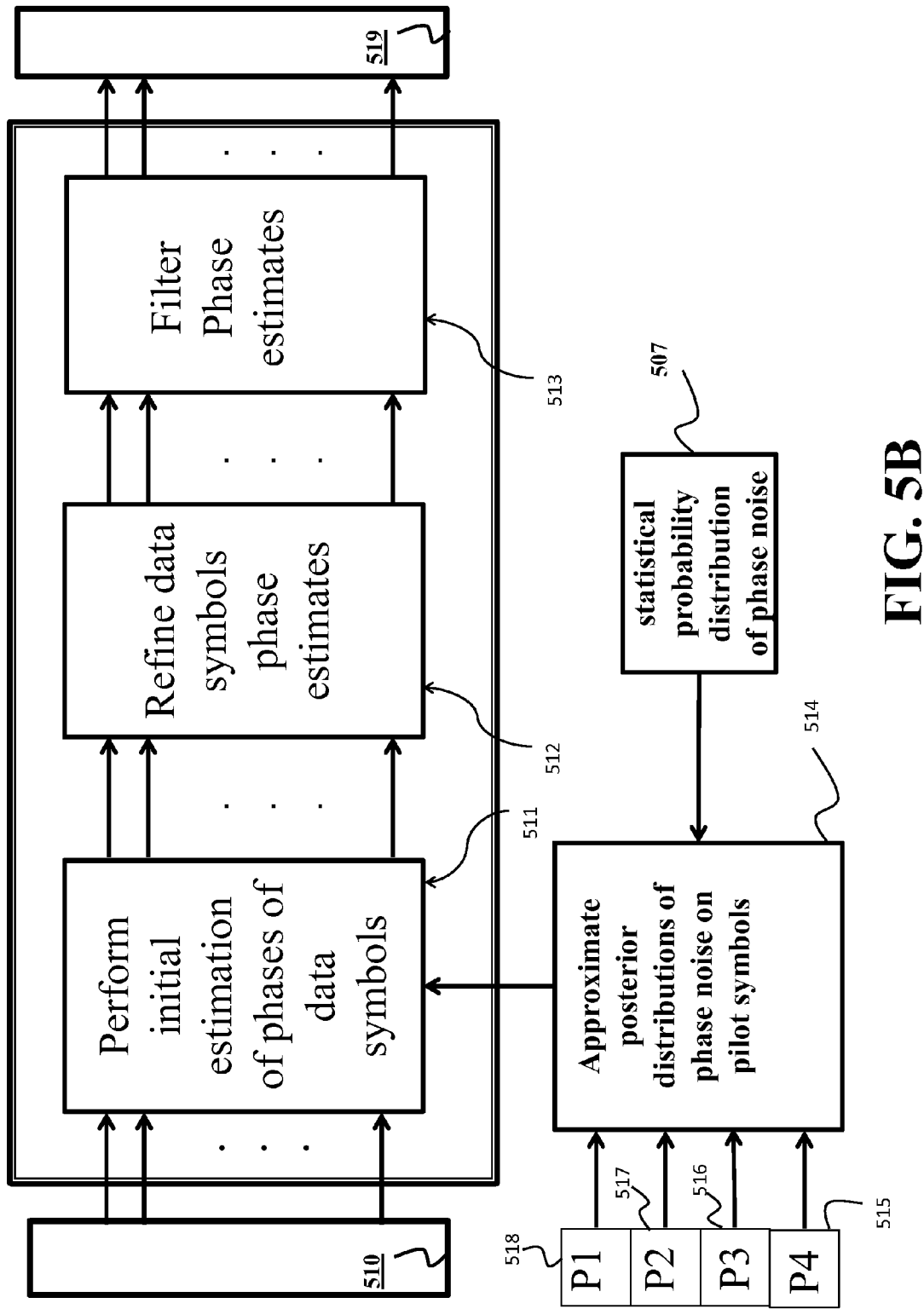
FIG. 5B is a block diagram of an exemplar implementation of pilot-aided phase equalization according to one embodiment of the invention.

FIG. 5B shows a block diagram of an exemplar implementation of pilot-aided phase equalization according to one embodiment of the invention. In this example, four pilot symbols (515, 516, 517, and 518) are used to estimate phase on one block of data symbols (510). The pilots, which can include adjacent and/or non-adjacent pilot symbols, are used to calculate the approximate posterior probability distribution of pilot phases (514). These phases are then used to perform initial estimation of the probability distributions of data symbol phases (511), given statistical models of phase noise and additive noise. These data symbol phase estimates are then refined (512), and filtered (513), before the final phase estimates (519) are output.

Figure 5C:
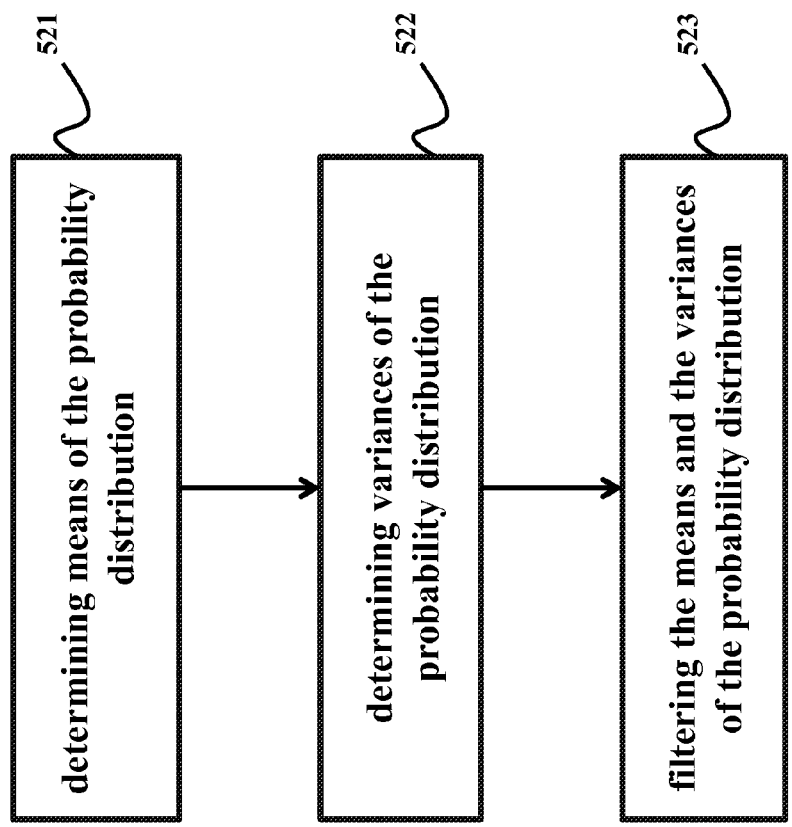
FIG. 5C is a block diagram of a method for determining the probability distribution of phase noise on the pilot symbols according to one embodiment of the invention.

FIG. 5C shows a block diagram of a method for determining the probability distribution of phase noise on the pilot symbols according to one embodiment of the invention. The method determines 521 means of the probability distribution of phase noise on the pilot symbols using the errors between phases of the received and the transmitted pilot signals and determines 522 variances of the probability distribution of phase noise on the pilot symbols using variances of the statistical probability distribution of phase noise and distortion from the optical channel.

In some variations, the method also filters 523 the means and the variances of the probability distribution of phase noise on the pilot symbols to reduce a distortion of the means and the variances. For example, the method can use forward and/or backward Kalman filter for filtering the posterior means and variances of the probability distribution of phase noise. In another example, the method can use Wiener filter to minimize the mean-square error given the phase noise model such as a Wiener process.

Figure 5D:
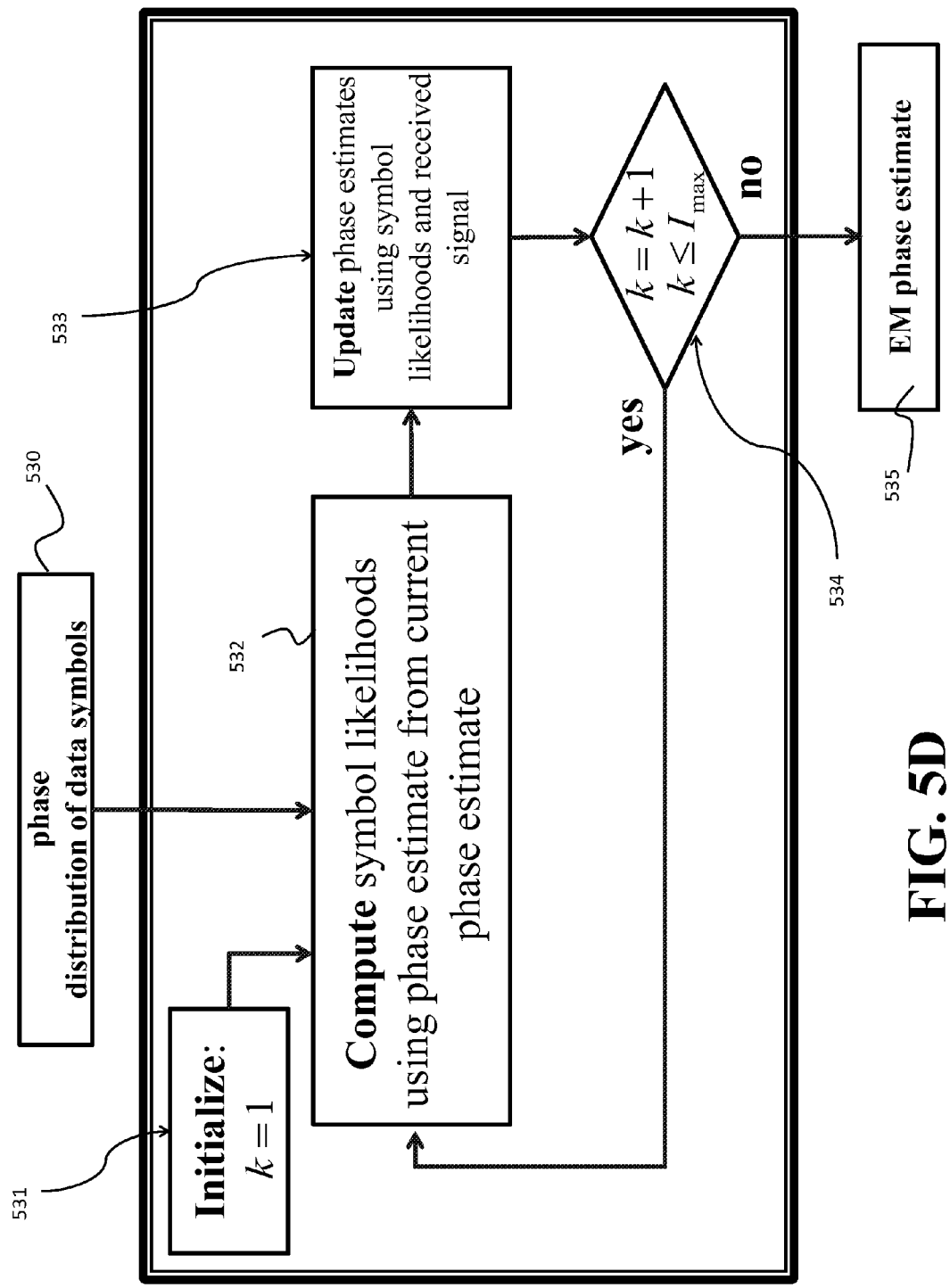
FIG. 5D is a block diagram of a method for refining the probability distribution of phase noise on the data symbols according to one embodiment of the invention.

FIG. 5D shows a block diagram of a method for refining the probability distribution of phase noise on the data symbols according to a probability distribution of the data symbols and the received data symbols according to one embodiment of the invention. Initial estimates 530 of data symbol phases are the input to the method. After initialization (531), symbol likelihoods are calculated in parallel for each received data symbol (532). To calculate the symbol likelihoods, the initial phase estimates of means and variances are interpolated to calculate symbol likelihoods for each received data symbol. For example, linear interpolation, second-order polynomial interpolation, cubic spline interpolation, or Gaussian process interpolation is used. Each phase estimate is then updated according to the symbol likelihoods and received signal (533). If the maximum iteration count is reached, the method then terminates (534), otherwise, the symbol likelihoods are re-calculated using the new phase estimates. The final output (535) is the phase estimate after expectation-maximization (EM).

Figure 5E:
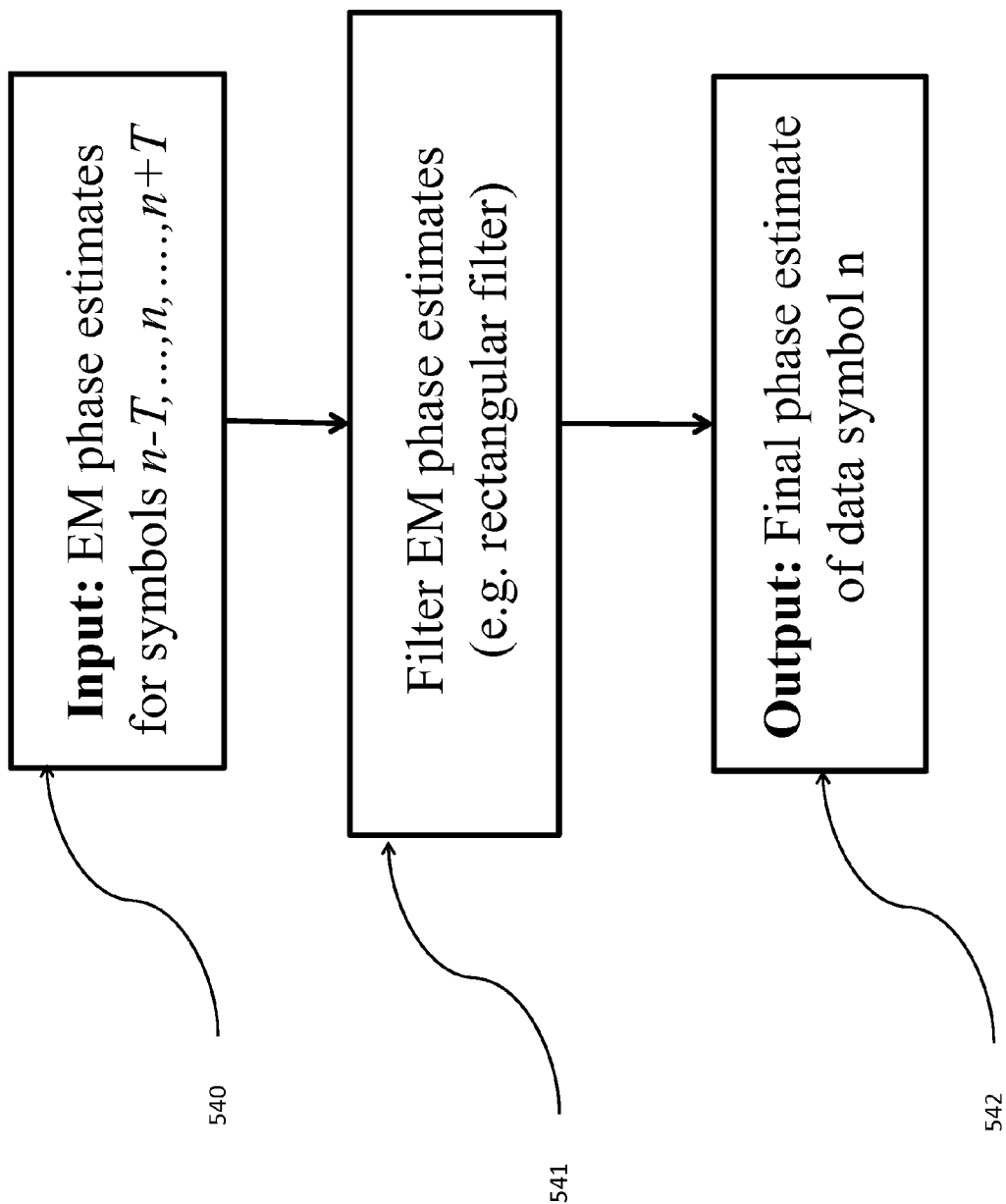
FIG. 5E is a flow diagram of a method for filtering the refined probability distribution of phase noise on the data symbols according to one embodiment of the invention.

FIG. 5E shows a block diagram of a method for filtering the refined probability distribution of phase noise on the data symbols to produce a final estimate of the probability distribution of phase noise on the data symbols according to one embodiment of the invention. The input symbol phases (540), are filtered with some low-pass filter; such as a rectangular, averaging filter (541). The filtered phase estimates are then output (542).

Some embodiments of the invention are based on realization that a subset of corresponding received and transmitted pilot signals can be grouped together to form a group, and that group of the pilot symbols can be used for determining the average error of the amplitudes for determining the filtering coefficients and/or for determining the errors between the phases of the received and the transmitted pilot symbols in the group to determine the probability distribution of phase noise on the pilot symbols.

Moreover, some embodiments are based on a recognition that such a group can be formed by pilot symbols received at different instance of time on the optical channel, as shown in FIG. 1B, but also such a group can be formed by pilot symbols received on different optical channels.

Figure 6:
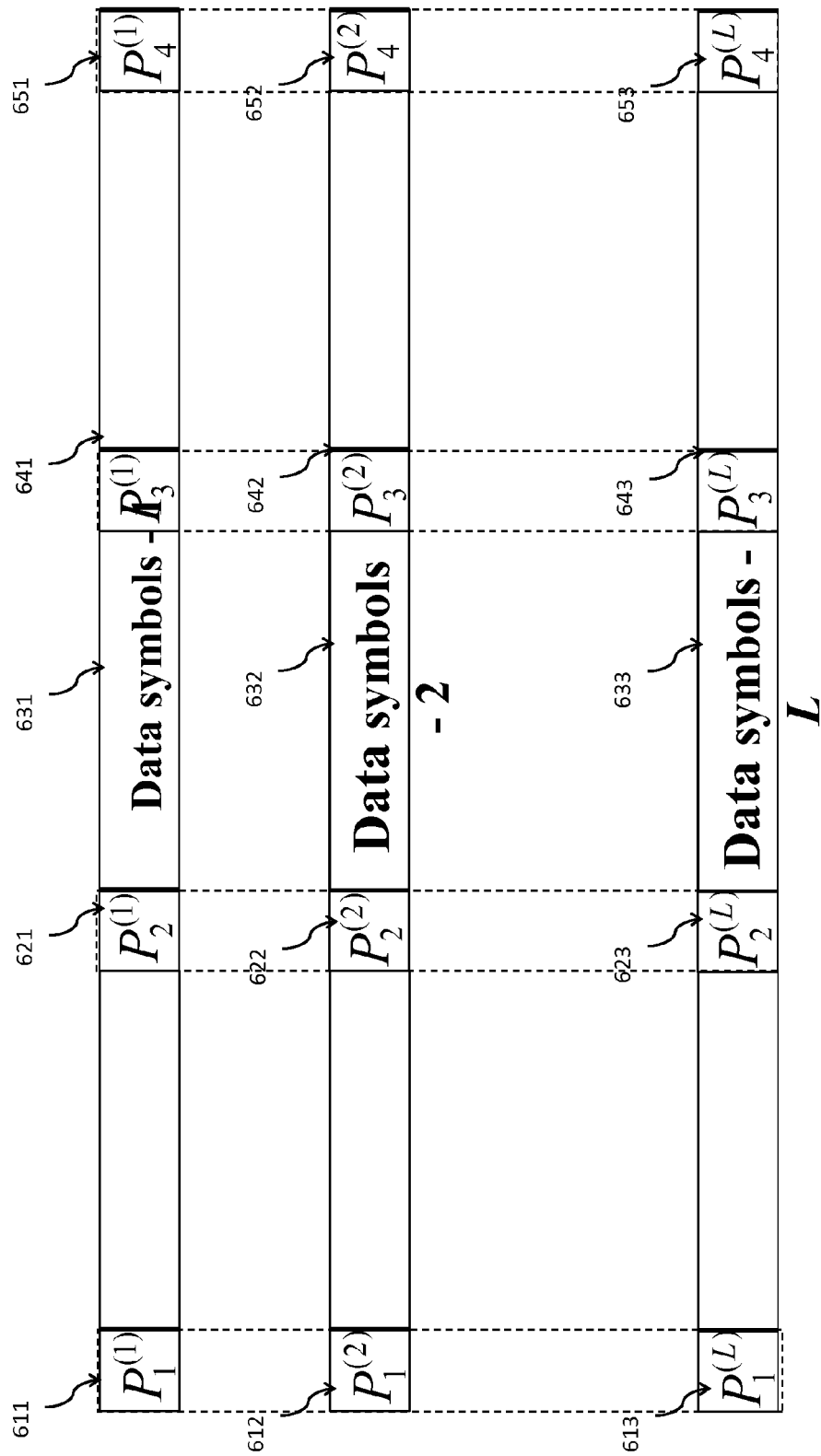
FIG. 6 is a schematic of the structure of the pilot symbols within the data symbols for the purpose of multi-channel phase estimation.

FIG. 6 shows the structure of the pilot symbols within the data symbols for the purpose of multi-channel phase estimation. Several pilot symbols (611, 612, 613, 621, 622, 623, 641, 642, 643, 651, 652, 653) are distributed through several blocks of data symbols (631, 632, 633) on several different channels. Phase estimation on a several, simultaneous blocks of data symbols (631, 632, 633) can be performed jointly, using adjacent pilot symbols (621, 622, 623, 641, 642, 643) and optionally, non-adjacent pilot symbols (611, 612, 613, 651, 652, 653).

Figure 7A:
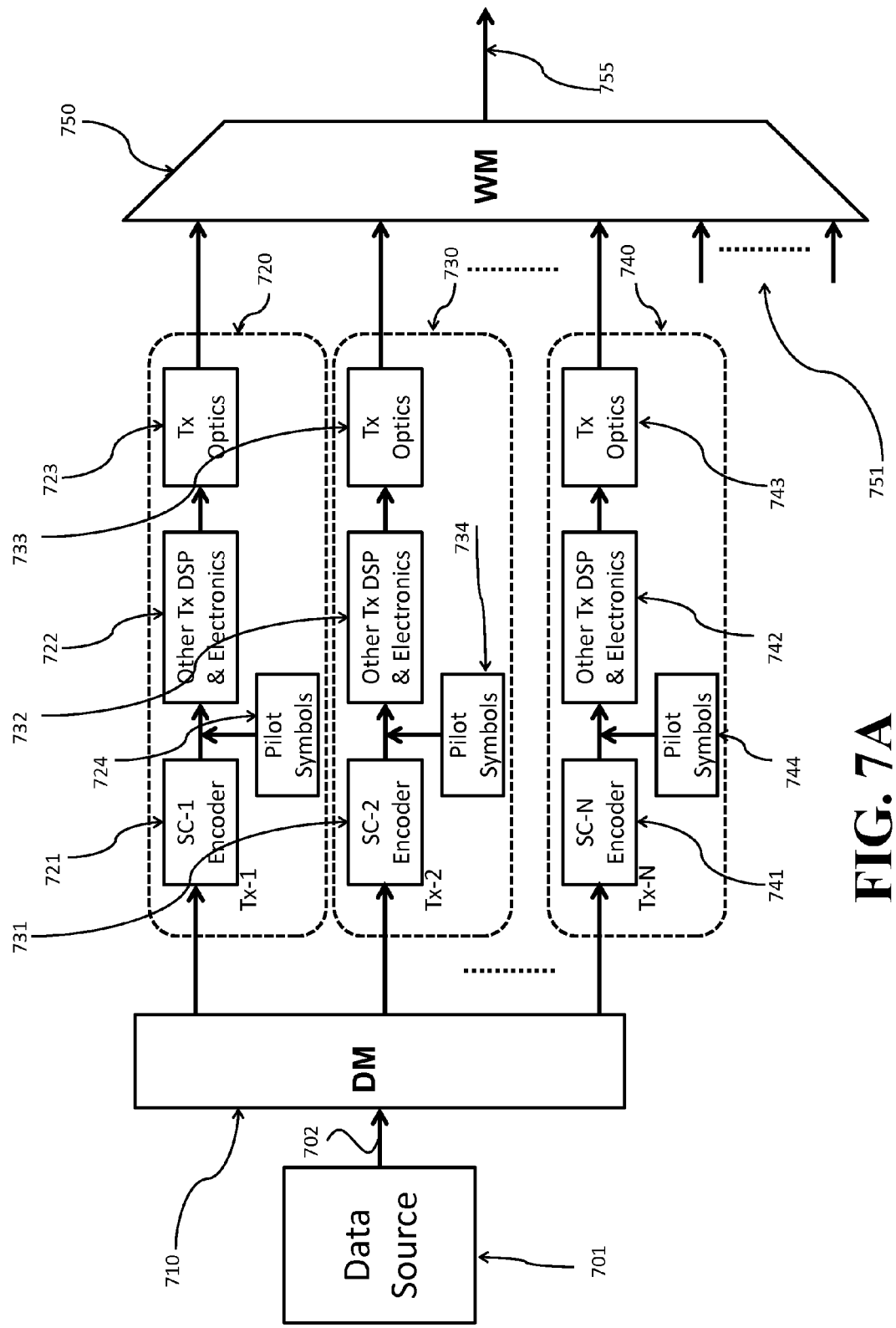
FIG. 7A is a block diagram of a transmitter for a multi-channel pilot-aided optical communications system according to some embodiments of the invention.

FIG. 7A shows a block diagram of a transmitter for a multi-channel pilot-aided optical communications system according to some embodiments of the invention. Data (702) from a source (701), are sent to a data de-multiplexer (DM) (710), where the data are broken up into several data streams, each of which is to be transmitted on a different wavelength. Each of the data streams is then sent to its own transmitter (720, 730, 740). In the transmitter, the data are encoded by an FEC encoder (721, 731, 741), before pilot symbols (724, 734, 744) are inserted intermittently. The signals then undergo processing with DSP and other front end electronics (722, 732, 742) such as analog-to-digital convertors. The signals are then sent to the transmitter optics (723, 733, 743) for modulation on to the optical carrier. The optical signal is then sent to a wavelength multiplexer (WM) (750), to optionally being combined with other independent optical signals which have different wavelengths (751), before being sent to the optical channel (755).

Figure 7B:
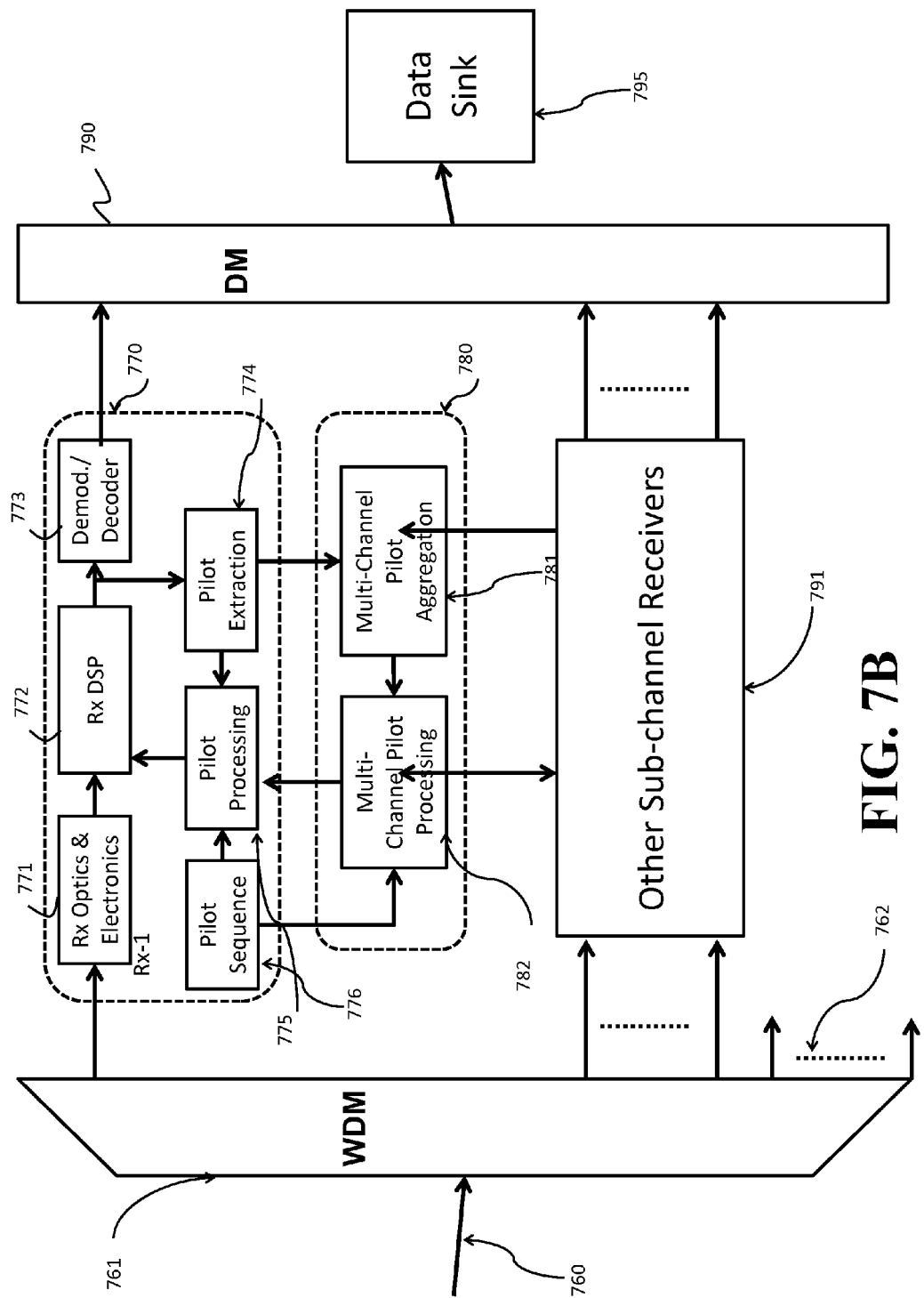
FIG. 7B is a block diagram of a receiver for a multi-channel pilot-aided optical communications system according to some embodiments of the invention.

FIG. 7B shows a block diagram of a receiver for a multi-channel pilot-aided optical communications system according to some embodiments of the invention. The signal from the optical channel (760) is sent to a wavelength de-multiplexer (WDM) (761). Other wavelengths (762) are optionally sent to other receivers for processing independently of the wavelength channel of interest. The signals of interest are then sent to the relevant sub-channel receivers (770, 791). Inside the receiver, the optical signal is detected by the optical receiver front end (771). This block comprises both optical and electronic elements, such as down-conversion, amplification, and quantization. The digital signal is then processed by DSP (772).

After DSP processing, the received pilot symbols are extracted (774), and processed (775) in combination with the known transmitted pilot sequence (776). The extracted pilot symbols (774) are also sent to a processor which considers pilot symbols from all sub-channels (780). In this processor, received pilot symbols are aggregated from different sub-channels (781), before digital processing is performed (782), considering both received and transmitted pilot sequences from all sub-channels. Information from both the single channel pilot processing (775) and multi-channel pilot processing (782) is then used in the Rx DSP (772) for functions such as amplitude and phase equalization. The processed signal is then sent for demodulation and FEC decoding (773), before being re-multiplexed (790), and sent to the data sink (795).

Figure 8:
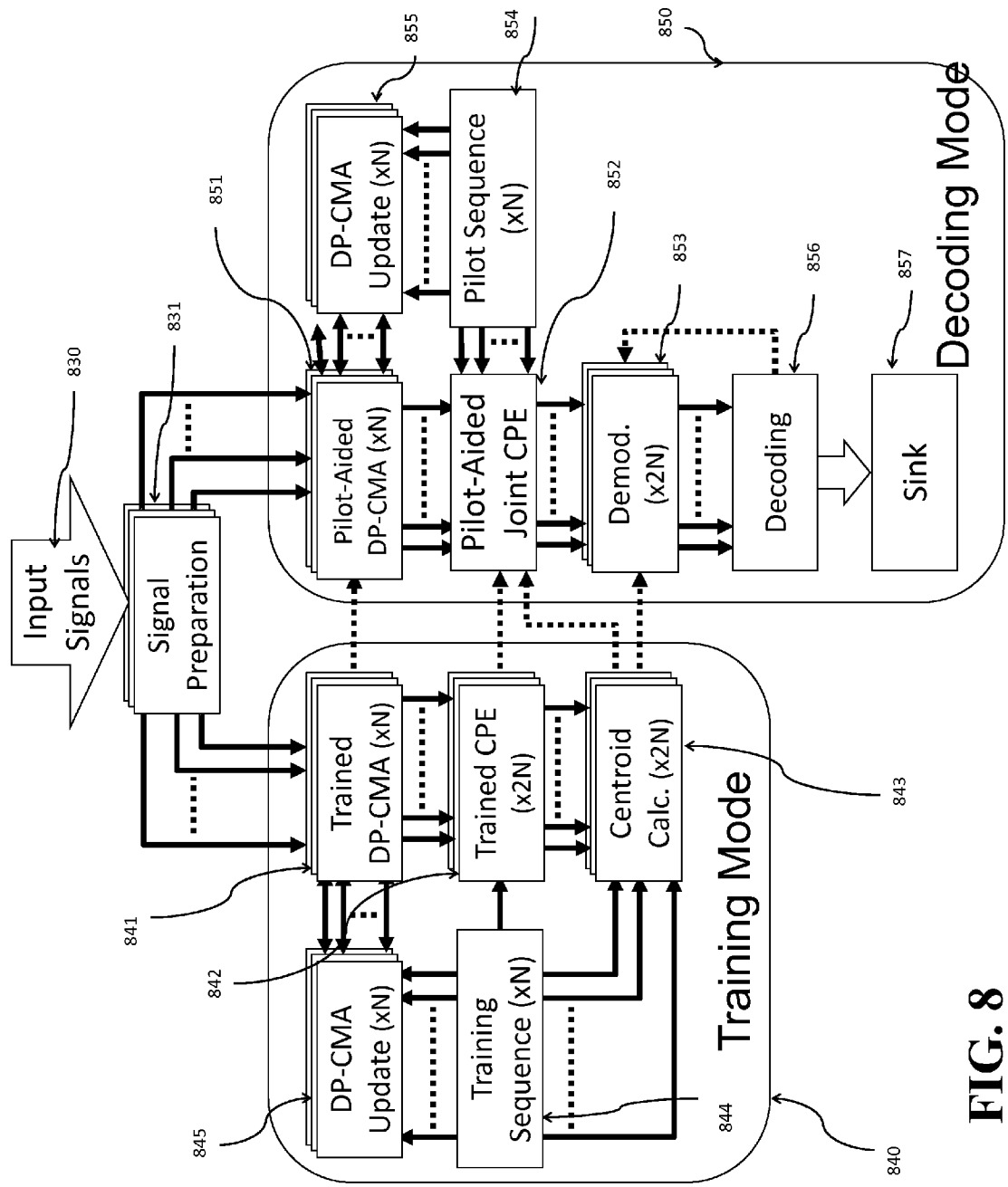
FIG. 8 is a schematic of the receiver for a multi-channel pilot-aided optical communications system incorporating training-aided initialization according to some embodiments of the invention.

FIG. 8 shows a schematic of the receiver DSP for a multi-channel pilot-aided optical communications system incorporating training-aided initialization according to some embodiments of the invention. The input signals (830) are prepared for processing (831), by performing static functions such as normalization, chromatic dispersion compensation, and intradyne-frequency offset compensation. The signals are optionally sent to a training mode (840), which aims to perform accurate initialization of the equalization, carrier phase estimation (CPE) and demodulation algorithms. In training mode, the signal is sent to N-parallel, trained DP-CMA adaptive equalizers (841). N-parallel training sequences (844) of pilot symbols are used to calculate the CMA error terms, from which the tap updates of the DP-CMA algorithms are calculated (845), using for example, the LMS algorithm. The outputs of the equalizers have randomly varying phase, which is tracked by trained CPE algorithms (842), which also take advantage of the known training sequences (844).

The outputs of the trained CPE are used to calculate the centroid of each constellation point in the training sequence (843). When the equalizer has converged sufficiently well, and the centroid calculations are considered accurate, the receiver is switched to pilot-aided mode (850). In this case, the prepared signals are processed with N-parallel pilot-aided DP-CMA algorithm equalizers (851), whose taps are initialized optionally by those calculated by the trained DP-CMA equalizers (841). The pilot-aided DP-CMA equalizers are adapted periodically (855) according to the pilot sequences (854), although the update takes account of the radius of the pilot symbols only.

After equalization, the signal undergoes pilot-aided joint CPE (852), where information from received pilot symbols on all sub-channels are considered in the CPE algorithm. The initial estimates of phase are optionally provided by the training mode. Following CPE, the signals undergo demodulation (853) and decoding (856), with these operations optionally accounting for the centroid calculations provided by (843) during training mode. Finally, the recovered and decoded data are sent to its destination, the sink (857).

Exemplar Embodiment

Setup

N information symbols are transmitted in a block (510 in FIG. 5B). To estimate the phase of a symbol transmitted during the n-th signaling interval, $K_1$ pilots preceding and $K_2$ pilots following the considered symbol are used. Without loss of generality, assume that $K_1=K_2=K$. Therefore, the phases of information symbols belonging to the same block are estimated using the same set of pilots $\mathcal{P} = \{p_1, \ldots, p_K, p_{K+1}, \ldots p_{2K}\}$ such that the pilots $p_K$ and $p_{K+1}$ border the considered information block. FIG. 5B shows an example where K=2 and phase estimation of data symbols is aided with pilots $p_1, p_2, p_3$ and $p_4$ (515, 516, 517 and 518 in FIG. 5B). In some embodiments of pilot-aided phase recovery schemes use K=1. Additionally or alternatively, a single pilot might belong to more than one set of pilots. Also, the phases corresponding to different information blocks can be estimated using different sets of pilots.

Assuming all signal impairments but phase and additive noise have been compensated, a sample of the received signal at discrete time n, $y_n$, is related to the symbol transmitted in the corresponding signaling interval, $x_n$, as $$y_n = x_n e^{j\theta_n} + v_n, \tag{1}$$

where $\theta_n$ and $v_n$ are the samples of respectively, a real-valued phase noise and complex-valued additive white Gaussian noise. That is, $v_n \sim \mathcal{CN}(0, \sigma^2)$, while phase noise $\theta_n$ is modeled in 507 (FIGS. 5A and 5B) as a Wiener process $$\theta_n - \theta_{n-1} \sim \mathcal{N}(0, \sigma_p^2), \quad \sigma_p^2 = \pi \Delta \nu T_s, \tag{2}$$

where $\Delta \nu$ is an effective total linewidth of the transmitter's and receiver's lasers and $T_s$ is the signaling interval (inverse of the baud rate).

Because the consecutive pilots $p_{k+1}$ and $p_k$ are separated by N+1 signaling intervals (i.e., by N information symbols), the phase change is using (2) modeled as $$\theta_{p_{k+1}} - \theta_{p_k} \sim \mathcal{N}(0, (N+1)\sigma_p^2), \text{ where } k=1, \ldots, 2K-1. \tag{3}$$

From Equation (1), the distribution of the received signal $y_n$, conditioned on the transmitted symbol $x_n$ and phase noise $\theta_n$, is given by $$p(y_n | x_n, \theta_n) \sim \mathcal{CN}(x_n e^{j\theta_n}, \sigma^2). \tag{4}$$

The phase recovery is framed as a statistical inference problem and the goal is to compute/approximate the probability distribution of unknown phase $\theta_n$, conditioned on our knowledge of transmitted symbols and received signals at pilot locations. The method approximates $$p(\theta_n | x_{p_k}, y_{p_k}, k=1, \ldots, 2K), n=1, \ldots, N.$$

Given the transmitted symbols and received signals at pilot locations, the method infers phases of pilot symbols in 501 (FIG. 5A) and 514 (FIG. 5B). Using the inferred pilot symbol phases and the received signals at the locations of the data symbols, the method estimates phases of information symbols in 502 (FIG. 5A and FIG. 5B). The output includes the estimates of information symbol phases and (optionally) soft and hard estimates of the transmitted symbols.

Determining Probability Distribution of Phase Noise on the Pilot Symbols

The goal of this processing stage is to infer pilot symbol phases based on transmitted symbols and received signals on pilot locations. Formally, this stage evaluates the posterior distribution $p(\theta_{p_k} | x_{p_1}, y_{p_1}, \ldots, x_{p_{2K}}, y_{p_{2K}})$, $k=1, \ldots, 2K$. A block diagram summarizing processing steps is shown in FIG. 5C.

Processing in this stage starts with computing the posterior distribution $p(\theta_{p_k} | x_{p_k}, y_{p_k})$. This posterior can be evaluated using the Bayes' rule and model (1). However, this distribution is not given in a closed form and one embodiment approximates the distribution. The Laplace method approximates a probability distribution with Gaussian distribution, of mean equal to the maximum likelihood estimate of the underlying parameter, and variance evaluated from the observed Fisher information.

As used by some embodiments after few steps of derivations, which are omitted here, the pilot symbol phases are approximated in 514 (FIG. 5B) as $$p(\theta_{p_k}|x_{p_k},y_{p_k}) \sim \mathcal{N}(\mu_{p_k},\sigma_{p_k}^2), k=1,\ldots,2K, \quad (5)$$

where means and variances $$\mu_{p_k} = \arg\{y_{p_k} x_{p_k}^*\} \text{ and } \sigma_{p_k}^2 = \frac{\sigma^2}{2|x_{p_k} y_{p_k}|} \quad (6)$$

are computed in 521 and 522 (FIG. 5C), respectively. For example, the mean and variance of the approximating Gaussian distribution can be evaluated for each pilot separately and in parallel. Such an evaluation results in a closed form expressions for mean and variance. In addition, Gaussian distribution with this mean and variance accurately approximates the true posterior distribution.

The posterior distributions evaluated in the previous step are updated so as to account for correlations between phases of pilot symbols. This is achieved by using Kalman filtering framework in 523 (FIG. 5C). The linear dynamical model is the Wiener model for phase noise dynamics (2). Using the result from the previous step, the observation model is constructed as $$\psi_{p_k} = \theta_{p_k} + n_{p_k}, \text{ where } \psi_{p_k} = \mu_{p_k} \text{ and } n_{p_k} \sim \mathcal{N}(0, \sigma_{p_k}^2). \quad (7)$$

Note that the mean $\mu_{p_k}$ is the "observation" of an unknown phase $\psi_{p_k}$. The observation noise $n_{p_k}$ is Gaussian distributed with zero mean and variance $\sigma_{p_k}^2$. The means and variances are evaluated in the previous step using (6).

Using linear dynamical model (2) and observation model (7), Kalman filter (i.e., full forward pass through the model) yields $$p(\theta_{p_k}|x_{p_1},y_{p_1},\ldots,x_{p_k},y_{p_k}) \sim \mathcal{N}(\tilde{\mu}_{p_k}, \tilde{\sigma}_{p_k}^2), k=1,\ldots,2K. \quad (8)$$

This is followed by Kalman smoother which performs backward pass from pilot $p_{2K}$ up to and including pilot $p_{K+1}$ and yields means of Gaussian posteriors. That is, $$p(\theta_{p_k}|x_{p_1},y_{p_1},\ldots,x_{p_k},y_{p_k}) \sim \mathcal{N}(v_{p_k},\cdot), k=K+1,\ldots,2K. \quad (9)$$

The processing step in 523 involving Kalman filtering and smoothing can require sequential processing. To overcome this shortcoming, the number of pilots 2K can be reduced. In fact, some embodiments are based on understanding that increasing the number of pilots 2K beyond some small number provides no performance gain. This threshold depends on the number of information symbols in a block N and variance of phase noise jumps $\sigma_p^2$ and can very likely be as low as 4.

Alternatively, the equivalent processing in this step can also be performed in parallel by Wiener filtering in some embodiments with computational resources allowing for inverting a matrix of size 2K at each pilot location. This can be advantageous because sequential Kalman smoothing is not required and a small number of pilots of 2K=4 already brings the solution to the edge of possible performance improvements in many practical applications. In one embodiment, the matrix inversion is avoided by providing the inverse matrix of the auto-covariance matrix offline based on the model of Wiener process.

The described processing stage outputs posterior means $\tilde{\mu}_{p_K}$ and $v_{p_{K+1}}$ and posterior variance $\tilde{\sigma}_{p_K}^2$. These quantities contain information required for phase estimation of data symbols in 502, described in the following part.

The pseudo-code corresponding to the described processing stage is:

Data: Transmitted and received pilots: $x_{p_1}, y_{p_1}, \ldots, x_{p_{2K}}, y_{p_{2K}}$
Result: Posterior means and variance: $\tilde{\mu}_{p_K}, v_{p_{K+1}}$ and $\tilde{\sigma}_{p_K}^2$
Parallel for k=1: 2K do $$\mu_{p_k} = \arg\{y_{p_k} x_{p_k}^*\} \text{ and } \sigma_{p_k}^2 = \frac{\sigma^2}{2|x_{p_k} y_{p_k}|};$$

end $$\tilde{\mu}_{p_1} = \mu_{p_1} \text{ and } \tilde{\sigma}_{p_1}^2 = \sigma_{p_1}^2;$$

for k = 1: 2K do $$b = (N+1)\sigma_p^2 + \tilde{\sigma}_{p_{k-1}}^2 \text{ and } a = \frac{b}{b+\sigma_{p_k}^2};$$

$$\tilde{\mu}_{p_k} = a\mu_{p_k} + (1-a)\tilde{\mu}_{p_{k-1}} \text{ and } \tilde{\sigma}_{p_k}^2 = a\sigma_{p_k}^2;$$

end $$v_{p_{2K}} = \tilde{\mu}_{p_{2K}};$$

for k = 2K: (−1): (K + 1) do $$a = \frac{\tilde{\sigma}_{p_k}^2}{\tilde{\sigma}_{p_k}^2 + (N+1)\sigma_p^2};$$

$$v_{p_k} = av_{p_{k+1}} + (1-a)\tilde{\mu}_{p_k};$$

end.

Determining Probability Distribution of Phase Noise on the Data Symbols

This stage, which performs phase estimation of data symbols, can include three processing steps 511, 512 and 513, shown in FIG. 5B according to some embodiments. The processing step 511 delivers initial estimates of data symbol phases using the posterior distributions of pilot symbol phases, evaluated in 501 (FIG. 5A). The information symbols are located between pilots $p_K$ and $p_{K+1}$, and using the Wiener process model for phase noise (2), it can be shown that the posterior $p(\theta_n|x_{p_1}, y_{p_1}, \ldots, x_{p_{2K}}, y_{p_{2K}})$, n=1, \ldots, N, is Gaussian distributed with mean and variance dependent upon means and variances of Gaussian posteriors corresponding to pilots $p_K$ and $p_{K+1}$. More precisely, omitting the derivation details, posterior distribution of the n-th information symbol is given by $$p(\theta_n|x_{p_1},y_{p_1},\ldots,x_{p_{2K}},y_{p_{2K}}) \sim \mathcal{N}(\mu_n, \sigma_n^2), \quad (10)$$

where the mean $\mu_n$ is given by a linear interpolation:

$$\mu_n = \frac{(N+1-n)\sigma_p^2 \tilde{\mu}_{p_K} + (n\sigma_p^2 + \tilde{\sigma}_{p_K}^2) v_{p_{K+1}}}{(N+1)\sigma_p^2 + \tilde{\sigma}_{p_K}^2} \quad (11)$$

The posterior means $\mu_n$'s are evaluated separately in parallel using (11). They are viewed as initial estimates of the information symbol phases and are refined in the following processing step. In another embodiment, the mean and variances are obtained by a second-order polynomial interpolation, cubic spline interpolation, and Gaussian process Kriging interpolation in a parallel fashion.

The initial phase estimates are refined in 512 by employing the EM method, as outlined in FIG. 5D. Due to a non-convex nature of the underlying optimization problem, the EM method converges to a local stationary point closest to the initial point. Therefore, the EM method needs to be initialized with a phase estimate that is already reasonably close to the true phase to yield better phase estimate. Otherwise, the method converges to some other, undesirable stationary point.

A separate EM method refines initial phase estimate $\mu_n$ of each information symbol in parallel. In the following, we present the computations involved and skip the derivation details. The EM routine corresponding to symbol $x_n$ is initialized with $\hat{\theta}_n^{(0)} = \mu_n$. The k-th iteration starts with evaluating the likelihood of symbol $x_n$ given the received signal $y_n$ and phase estimate $\theta_n^{(k-1)}$, obtained from iteration k−1. This likelihood, evaluated in 532 (FIG. 5D), is up to a normalization constant given by $$p(x_n = a \mid y_n; \hat{\theta}_n^{(k-1)}) \propto p(y_n \mid x_n = a; \hat{\theta}_n^{(k-1)}) p(x_n = a; \hat{\theta}_n^{(k-1)}) \quad (12)$$

$$\propto \exp\left(-\frac{1}{\sigma^2}|y_n - ae^{j\hat{\theta}_n^{(k-1)}}|^2\right), \quad (13)$$

where $x_n$ takes values from the transmitted constellation, i.e., $a \in \chi$. The transmitted symbols are uniformly at random drawn from the constellation so that $p(x_n = a; \hat{\theta}_n^{(k-1)}) \ni 1$. The symbol likelihoods are further used to update phase estimate in 533 (FIG. 5D) such that $$\hat{\theta}_n^k = \arg(y_n \Sigma_{a \in \chi} a^* p(x_n = a \mid y_n; \hat{\theta}_n^{(k-1)})) \quad (14)$$

The EM method is performed until a termination condition 534 (FIG. 5D) is satisfied, e.g., until a predefined number of iterations $I_{max}$ is reached and outputs EM phase estimates in 535 (FIG. 5D). To reduce the computational complexity, the number of iterations $I_{max}$ can be kept small. In some embodiments, the method converges after only two iterations and no improvement is made if more than two iterations are used.

Additionally, the complexity burden arising from computing the symbol likelihoods in high order modulation formats (such as 64 QAM or 256 QAM) can be alleviated by considering only a subset of symbols in the constellation. For example, the likelihoods of symbol $x_n$ can be evaluated only for a certain number of symbols in the constellation which are closest in the Euclidean distance to $y_n e^{-j\mu_n}$. This is because $\mu_n$ is already relatively close to the true phase $\theta_n$ which, in the first line, makes the application of the EM procedure a viable approach.

The EM methods can be performed separately on information symbols (and thus in parallel). This, in turn, means that the correlation structure of phase variations across symbols is not exploited. Some embodiments develop the EM method which takes into account the statistics of phase variations. However, the phase estimates in such a method are updated as arguments which minimize some objective function and are not given in closed forms. Also, such a method does not admit parallel implementation and is therefore not practical.

To overcome the shortcoming of not taking into account the statistics of phase variations in the EM procedures, the final processing step 513 filters the EM phase estimates $\hat{\theta}_n^{I_{max}}$, as outlines in FIG. 5E. For example, one embodiments filter these estimates using a moving average filter such that the final phase estimate at discrete time n is $$\hat{\theta}_n = \frac{1}{2T+1} \sum_{i=n-T}^{n+T} \hat{\theta}_i^{(I_{max})}. \quad (15)$$

The method outputs phase estimates 519 of the data block.

Optionally, along with the final phase estimates, the method outputs soft and hard decisions of the transmitted symbols. Namely, given the final phase estimate $\hat{\theta}_n$ and received signal $y_n$, the soft decision is given as a vector of likelihoods evaluated for all constellation points $a \in \chi$. It is up to a normalization constant given by $$p(x_n = a \mid y_n; \hat{\theta}_n) \propto \exp\left(-\frac{1}{\sigma^2}|y_n e^{-j\hat{\theta}_n} - a|^2\right). \quad (16)$$

and evaluated in 505 (FIG. 5A). The hard decision is a constellation point a which maximizes the symbol likelihood evaluated above. In another embodiment, the residual phase noise estimation error based on the phase variance is used to calculate more accurate symbol likelihoods.

For example, the likelihood in (16) can be modified by the Tikhonov distribution, which uses the zero-th order Bessel function of the first kind to take the residual phase noise into account. In another example, the likelihood is modified by a linear-transform and bilinear transform to take the residual phase noise variance into account. This modified likelihood is advantageous when the pilot symbol interval is large and low SNR regimes because the residual phase noise variance is not constant over the data symbols.

The pseudo-code corresponding to the described processing stage is:
Data: Received signals: $y_1, \ldots, y_N$
Input: $\mu_{p_K}, v_{p_{K+1}}$ and $\sigma_{p_K}^2$
Result: Final phase estimates: $\hat{\theta}_1, \ldots, \hat{\theta}_N$
Parallel for n=1: N do
 $\alpha = (N+1-n)\sigma_p^2$, $\beta = n\sigma_p^2 + \sigma_{p_K}^2$, $\gamma = \alpha/(\alpha+\beta)$;
 $\mu_n = \gamma \mu_{p_K} + (1-\gamma) v_{p_{K+1}}$;
 $\hat{\theta}_n^{(0)} = \mu_n$;
 for k=1:$I_{max}$ do
  $p(x_n = a \mid y_n; \hat{\theta}_n^{(k-1)}) \ni \exp(-\sigma^{-2}|y_n - ae^{j\hat{\theta}_n^{(k-1)}}|^2)$, $a \in \chi$;
  $\hat{\theta}_n^{(k)} = \arg(y_n \Sigma_{a \in \chi} a^* p(x_n = a \mid y_n; \hat{\theta}_n^{(k-1)}))$;
 end
end
Filter $\hat{\theta}_1^{I_{max}}, \ldots, \hat{\theta}_N^{(I_{max})}$ to N yield $\hat{\theta}_1, \ldots, \hat{\theta}_N$.

Multi-Channel Phase Estimation

Some embodiments perform phase estimation in a multi-channel communications system. Multiple channels can refer to different carriers in a multi-carrier transmission, or different polarizations in a single carrier transmission, or different polarizations of multiple carriers. Multi-channel can be optionally extended to multi-mode multiplexing systems in a straightforward manner.

The overall number of channels, irrespective of the underlying mechanism, which generates the channels, is denoted with L. The signal received in channel l and at discrete time n is after equalization given by $$y_n^{(l)} = x_n^{(l)} e^{j\theta_n^{(l)}} + v_n^{(l)}, \quad (17)$$

where l=1, ..., L, $x_n^{(l)}$ is the transmitted symbol, $\theta_n^{(l)}$ is a sample of phase noise, and $v_n^{(l)}$ is a sample of additive noise, all corresponding to channel l and discrete time n. The additive noise is complex-valued, zero mean, white Gaussian process of variance dependent upon channel index, i.e., $v_n^{(l)} \sim \mathcal{CN}(0, \sigma_l^2)$.

As in a single channel case, each channel in a multi-channel scheme transmits a block of N information symbols, preceded by a pilot symbol, as shown in FIG. 6. The phase estimation of information symbols within a block is aided with K pilots preceding and K pilots following the block. In general, the number of pilots used on each side and in each channel can be different.

Some embodiments analyze different channels separately and apply the method described in the previous part to each channel in parallel. However, if phase variations across channels are correlated, the estimation performance can benefit from joint phase estimation. In the following, three possible embodiments for corresponding joint phase estimation are described.

Constant Phase Offsets Between Channels

In the first embodiment, phases of any two channels are equal up to some constant phase offset. Formally, the carrier phase of channel l is represented as $$\theta_n^{(l)} = \theta_n + \Delta\theta^{(l)}, \quad (18)$$

where $\theta_n$ is the phase of the reference channel and $\Delta\theta^{(l)}$ is the phase offset with respect to the reference channel. The phase offset depends on the channel index l and is constant in time n. Assuming that the phase offsets $\Delta\theta^{(l)}$ are given or estimated in some way, the goal is to estimate the common phase $\theta_n$, n=1, . . . , N.

To bring all the channels to the same phase, the phase offsets are compensated by rotating the received signals such that $$\tilde{y}_n^{(l)} = y_n^{(l)} e^{-j\Delta\theta^{(l)}}, l=1, \ldots, L. \quad (19)$$

This processing can be done in parallel and the resulting symbol sequences share the same phase across channels. This phase is estimated by employing a similar procedure as used for a single channel case. The only difference is that now a group of L pilots (one for each channel) which effectively undergo the same phase shift are used to estimate the phase at the corresponding time instant.

The method starts with approximating the posterior of pilot symbol phase $\theta_{p_k}$ with Gaussian distribution whose mean and variance are evaluated in respectively 521 and 522 (FIG. 5C) by taking advantage of all pilot symbols across L channels that correspond to the same instant $p_k$ and are given by $$\mu_{p_k} = \arg\left(\sum_{l=1}^{L} \tilde{y}_{p_k}^{(l)} \left(x_{p_k}^{(l)}\right)^*\right) \text{ and } \sigma_{p_k}^2 = \frac{0.5}{\sum_{l=1}^{L} \frac{|x_{p_k}^{(l)} \tilde{y}_{p_k}^{(l)}|}{\sigma_l^2}}. \quad (20)$$

The pilot phase posteriors are processed through a cascade of Kalman filter (with full forward pass) and Kalman smoother (with backward pass from $p_{2K}$ up to and including $p_{K+1}$) in 523 (FIG. 5C) the same way as for a single channel case. The smoothed pilot phase estimates are used to obtain initial estimates of information symbol phases using the same expression as for a single channel case.

The initial phase estimates of information symbols are refined in 512 (FIG. 5B) using the EM procedure, as outlined in FIG. 5D. The k-th EM iteration starts with evaluating the likelihoods of symbols across L channels in 532 (FIG. 5D). These likelihoods are evaluated for each symbol separately in parallel using $$p(x_n^{(l)} = a \mid \tilde{y}_n^{(l)}; \theta_n^{(k-1)}) \propto \exp\left(-\frac{1}{\sigma_l^2}\left|\tilde{y}_n^{(l)} - a e^{j\hat{\theta}_n^{(k-1)}}\right|^2\right), a \in X, \quad (21)$$

where l=1, . . . , L and n=1, . . . , N. Note that the superscript with l refers to channel index, while the superscript with k refer to iteration index.

The k-th EM iteration delivers an updated phase estimate evaluated in 533 (FIG. 5D) using $$\hat{\theta}_n^{(k)} = \arg(\sum_{l=1}^{L} \tilde{y}_n^{(l)} \sum_{a \in \chi} a^* p(x_n^{(l)} = a \mid y_n^{(l)}; \hat{\theta}_n^{(k-1)})). \quad (22)$$

As for a single channel embodiment, the EM method does not exploit correlation structure of the phase process. Therefore, to overcome this shortcoming, the EM phase estimates are filtered (for example, using a moving average filter) in 513 (FIG. 5B). The filter outputs are the final phase estimates 519 (FIG. 5B). Optionally, soft and hard decisions of the transmitted symbols can be evaluated from the final phase estimates and received signals.

Correlated Phases Across Channels

Another embodiment uses a method for joint phase estimation when phase changes across channels are correlated. To formalize the model, denote with $\theta_i$ a vector of phases at discrete time i across channels l=1, . . . , L. That is, $$\theta_i = [\theta_i^{(1)} \ldots \theta_i^{(L)}]^T \quad (23)$$

The phase vector $\theta_i$ varies such that the change between two consecutive time instants i−1 and i is modeled as $$\theta_i - \theta_{i-1} \sim \mathcal{N}(0, C), \quad (24)$$

where C is the covariance matrix of phase jumps across channels. By assumption, this matrix is predefined or estimated using some methods. Equation (24) implies that phase in a single channel l follows a Wiener process with the variance of phase jumps equal to the corresponding diagonal element in C, denoted with $c_{ll}$.

The joint estimation of phases across channels can be performed in two stages 501 and 502. The first stage starts with approximating the posteriors of pilot symbol phases with Gaussian distributions. The mean 521 and variance 522 of the approximating Gaussian corresponding to pilot $p_k$ in channel l are given by $$\mu_{p_k}^{(l)} = \arg(y_{p_k}^{(l)} (x_{p_k}^{(l)})^*) \text{ and } (\sigma_{p_k}^2)^{(l)} = \frac{\sigma_l^2}{2|x_{p_k}^{(l)} y_{p_k}^{(l)}|}, \quad (25)$$

where $x_{p_k}^{(l)}$ and $y_{p_k}^{(l)}$ are, respectively, the transmitted symbol and received signal corresponding to pilot $p_k$ and channel l, and $\sigma_l^2$ is the variance of additive noise in channel l. The means $\mu_{p_k}^{(l)}$ across channels are collected into a column vector $\mu_{p_k} = [\mu_{p_k}^{(1)} \ldots \mu_{p_k}^{(L)}]^T$. Similarly, the variances $\sigma_{p_k}^{(l)}$ across channels form a diagonal matrix $\Sigma_{p_k} = \text{diag}((\sigma_{p_k}^2)^{(1)}, \ldots, (\sigma_{p_k}^2)^{(L)})$.

The initial estimates of pilot symbol phases are smoothed in 523 by taking into account the correlation structure of phase variations in time and across channels. This is achieved by employing the Kalman filtering framework. Given that two consecutive pilots are separated by N information symbols, the linear dynamical model is using (24) given by $$\theta_{p_{k+1}} - \theta_{p_k} \sim \mathcal{N}(0, (N+1)C), k=1, \ldots, 2K-1. \quad (26)$$

The observation model is constructed from the initial estimates of pilot symbol phases obtained in (25) such that $$\psi_{p_k} = \theta_{p_k} + n_{p_k}, k=1, \ldots, 2K, \quad (27)$$

where the observed vector $\psi_{p_k} = \mu_{p_k}$ and observation noise $n_{p_k} \sim \mathcal{N}(0, \Sigma_{p_k})$.

Given the linear dynamical and observation model, the initial pilot phase estimates are processed via full forward pass of Kalman filtering and partial backward pass of Kalman smoothing that ends at pilot $p_{K+1}$. The outputs of this processing stage are the mean vector $\tilde{\mu}_{p_K}$ and covariance matrix $\tilde{\Sigma}_{p_K}$ corresponding to the pilot $p_K$ (and obtained from the forward pass, as well as the mean vector $v_{p_{K+1}}$, corresponding to the pilot $p_{K+1}$ and resulting from the backward pass.

Each step of sequential processing in Kalman filtering step performs matrix inversion. The size of a matrix is equal to the number of channels L. To alleviate the computational complexity, one may reduce the number of pilots 2K aiding phase estimation. This number depends on the number of information symbols N between two pilots and how quickly phase varies in time. In some applications, using more than 2K=4 pilots per channel provides no further gain in many scenarios of practical interest.

On the other hand, the complexity burden arising from performing matrix inversions might be reduced by, for example, approximating the covariance matrix C with a tridiagonal matrix (meaning that only the phases in adjacent channels are correlated), in which case the matrix inverse is relatively easy to compute.

The outputs $\tilde{\mu}_{p_K}$, $v_{p_{K+1}}$ and $\tilde{\Sigma}_{p_K}$ from the first processing stage are used to obtain initial estimates of information symbol phases in 511. Conceptually, one can interpolate between two Gaussian vectors (posteriors of the phases of pilots $p_K$ (and $p_{K+1}$ across all channels). However, this would necessitate computing N matrix inversions (one for each information symbol in a block). To alleviate this shortcoming, separate linear interpolations between pilot phases $p_k$ and $p_{K+1}$ in each channel are performed, such that the initial phase estimate of symbol n in channel l is given by $$\mu_n^{(l)} = \frac{(N+1-n)c_{ll}\tilde{\mu}_{p_K}^{(l)} + (nc_{ll} + (\tilde{\sigma}_{p_K}^2)^{(l)})v_{p_{K+1}}^{(l)}}{(N+1)c_{ll} + (\tilde{\sigma}_{p_K}^2)^{(l)}}, \quad (28)$$

Wherein $c_{ll}$ is the l-th diagonal element of C which represents the variance of phase noise jumps between two consecutive discrete time instants in the channel l. In another embodiment, second-order polynomial interpolation, cubic spline interpolation, or Gaussian process Kriging interpolation is used.

The initial phase estimates of information symbols are refined using the EM procedure 512. The EM procedure is separately applied to each information symbol in each channel in parallel. The details are the same as for a single channel case.

Note that phase correlations across channels are not taken into account by performing separate EM procedures. Conceptually, the EM procedures can be devised so as to account for these correlations. However, this would require more complicated routines for updating phase estimates. More specifically, a vector of phase estimates across channels would be updated as an argument which minimizes some objective function and is not given in a closed form.

The separate EM methods do not take into account phase correlations in time. In addition, even if computational resources allowed for performing phase updates, such a scheme is not fully parallelizable. The final phase estimates can be obtained by filtering 513 the EM phase estimates in each channel separately. A moving average filter is possible. Optionally, the soft and hard decisions of the transmitted symbols are obtained from the final phase estimates and received signals.

Highly Correlated Phases Across Channels

When phase variations across channels are highly correlated, the phase offsets between different channels slowly vary in time. This part presents a joint phase estimation method which exploits this observation. More formally, the assumption is that phase offsets between different channels are constant during one information block.

The joint phase estimation method infers pilot phases in the same way as described in the previous part. That is, it starts off with approximating the posterior distributions of pilot phases and processes them through a cascade of Kalman filtering and Kalman smoothing. The only difference is that full backward pass of Kalman smoothing is performed. This yields means $v_{p_1}, \ldots, v_{p_{2K}}$ of Gaussian posteriors of 2K pilot phase vectors (recall that a phase vector collects phases across all L channels).

The posterior means obtained from the backward pass are used to estimate the phase offsets between different channels. The phase offset between channel l and some reference channel (without loss of generality, we choose channel 1 to be a reference channel) is estimated by taking the average of the differences between corresponding pilot phase estimates, $$\Delta\theta^{(l)} = \frac{1}{2K}\sum_{k=1}^{2K}(v_{p_k}(l) - v_{p_k}(1)), \quad (29)$$

where $v_{p_k}(l)$ is the l-th element of $v_{p_k}$. Note that the above estimator uses all 2K pilots in both considered channels. However, if phase offset varies on a shorted time scale, only a subset of pilots should be used. In the most extreme case, only pilots $p_K$ and $p_{K+1}$ are used.

After the phase offsets $\Delta\theta^{(l)}$'s are determined, one embodiment rotates the information symbols in all channels using (19) so that the resulting symbols exhibit the same phase variation. The initial phase estimates of information symbols are obtained from posterior means of pilots $p_K$ and $p_{K+1}$ in the reference channel. The initial phase estimates can be refined using the EM method using Equations (21) and (22). The resulting phase estimates are filtered, for example with moving average filer, which yields the final phase estimates. Optionally, the soft and hard decisions of transmitted symbols are produced based on final phase estimates and received signals.

The above three embodiments for multi-channel pilot-aided phase estimation methods use all received signals obtained at different channels. In some embodiments, the received signals are shared among different channel receivers by using band-limited interconnects to distribute quantized received signals each other. To reduce the required data rates for interconnects, the received signals on pilot symbols are only shared, or the phase estimates of pilot symbol posteriors obtained by the single-channel pilot-aided algorithm are distributed to further refine the phase estimates by taking the channel correlation into account in multi-channel pilot-aided phase estimation algorithms. In some embodiments, to decrease the required data rates for interconnects, cooperative quantization methods such as Wyner-Ziv coding are used. The Wyner-Ziv coding can reduce the amount of quantization data while keeping the quantization distortion low, by using the signal correlation over different channels.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for decoding an optical signal transmitted over an optical channel from a transmitter to a receiver, comprising:
   receiving the transmitted optical signal;
   producing, from the transmitted optical signal, a digital signal including received data symbols and received pilot symbols;
   determining filtering coefficients based on an error between amplitudes of the received pilot symbols and amplitudes of transmitted pilot symbols, while ignoring errors between phases of the received pilot symbols and phases of the transmitted pilot symbols, wherein the amplitudes and the phases of the transmitted pilot symbols are known at the transmitter and the receiver;
   filtering the digital signal according to the filtering coefficients to produce a filtered signal with an equalized amplitude and an unconstrained phase; and
   demodulating and decoding the filtered signal to produce an estimate of the transmitted optical signal, wherein at least some steps of the method are performed using a processor of the receiver.

2. The method of claim 1, wherein a transmission of the optical signal includes a training mode and a decoding mode, wherein, during the training mode, the digital signal includes a continuous sequence of pilot symbols, further comprising:
   determining, during the training mode, the filtering coefficients based on the error between the amplitudes of the received pilot symbols and the transmitted pilot symbols in the continuous sequence; and
   initializing, during the decoding mode, the filtering coefficients determined during the training mode.

3. The method of claim 2, further comprising:
   determining an average error between the amplitudes of the received pilot symbols and the transmitted pilot symbols in the continuous sequence using a low pass filter; and
   determining the filtering coefficient using the average error.

4. The method of claim 2, further comprising:
   determining an error between each amplitude of the received pilot symbol and a corresponding transmitted pilot symbols in the continuous sequence to produce a sequence of errors; and
   updating the filtering coefficient iteratively for each error in the sequence of errors.

5. The method of claim 1, further comprising:
   updating the filtering coefficients iteratively in response to receiving each pilot symbol using a least-mean-square (LMS) or recursive least-squares (RLS) update.

6. The method of claim 1, further comprising:
   grouping a subset of corresponding received and transmitted pilot signals to form a group;
   determining an average error between the amplitudes of the received and the transmitted pilot symbols in the group; and
   determining the filtering coefficient using the average error.

7. The method of claim 6, wherein the group is formed by pilot symbols received at different instance of time on the optical channel.

8. The method of claim 6, wherein the group is formed by pilot symbols received on different optical channels.

9. The method of claimed 1, further comprising:
   determining a probability distribution of phase noise on the pilot symbols using a statistical probability distribution of phase noise on the optical channel and errors between phases of the received pilot symbols and the transmitted pilot signals;
   determining a probability distribution of phase noise on the data symbols using the statistical probability distribution of phase noise on the optical channel and the probability distribution of phase noise on the pilot symbols; and
   demodulating the filtered signal using the probability distribution of the phase noise on the data symbols.

10. The method of claim 9, wherein the demodulating comprises:
    determining the phase noise corresponding to the probability distribution of the phase noise on the data symbols; and
    applying a phase shift equal to an opposite of the phase noise to the filtered signal.

11. The method of claim 9, wherein the demodulating comprises:
    applying the probability distribution of phase noise on the data symbols to log-likelihood ratio calculations for the demodulating.

12. The method of claim 9, wherein the determining the probability distribution of the phase noise on the pilot symbols comprises:
    determining means of the probability distribution of the phase noise on the pilot symbols using the errors between phases of the received and the transmitted pilot signals; and
    determining variances of the probability distribution of the phase noise on the pilot symbols using variances of the statistical probability distribution of phase noise and distortion from the optical channel.

13. The method of claim 12, further comprising:
    filtering the means and the variances of the probability distribution of phase noise on the pilot symbols to reduce a distortion of the means and the variances.

14. The method of claim 9, further comprising:
    refining the probability distribution of the phase noise in the data symbols according to a probability distribution of the data symbols and the received data symbols.

15. The method of claim 14, further comprising:
    filtering the refined probability distribution of phase noise on the data symbols to produce a final estimate of the probability distribution of phase noise on the data symbols.

16. The method of claim 9, further comprising:
    grouping a subset of corresponding received and transmitted pilot signals to form a group;
    determining the errors between the phases of the received and the transmitted pilot symbols in the group; and
    determining the probability distribution of phase noise on the pilot symbols using the errors determined for the group.

17. The method of claim 16, wherein the group is formed by pilot symbols received at different instance of time on the optical channel.

18. The method of claim 16, wherein the group is formed by pilot symbols received on different optical channels.

19. A receiver for decoding an optical signal transmitted by a transmitter over an optical channel, comprising:
- a front end for receiving the transmitted optical signal to produce a digital signal including data symbols and pilot symbols;
- an amplitude equalizer for determining filtering coefficients based on an error between amplitudes of the received pilot symbols and amplitudes of transmitted pilot symbols, while ignoring errors between phases of the received pilot symbols and phases of the transmitted pilot symbols and for filtering the digital signal according to the filtering coefficients to produce a filtered signal with an equalized amplitude and an unconstrained phase;
- a phase equalizer for determining a probability distribution of phase noise on the data symbols using a statistical probability distribution of phase noise on the optical channel and a probability distribution of phase noise on the pilot symbols; and
- a decoder for demodulating and decoding the filtered signal using the probability distribution of phase noise on the data symbols to produce an estimate of the transmitted optical signal.

20. The receiver of claim 19, wherein the amplitude equalizer and the phase equalizer use a group of corresponding received and transmitted pilot signals, wherein the group is formed by pilot symbols received at different instance of time on the optical channel and by pilot symbols received on different optical channels, wherein the received pilot symbols are shared through band-limited interconnects with cooperative quantization.

* * * * *